(12) United States Patent
Kawabe et al.

(10) Patent No.: US 11,511,365 B2
(45) Date of Patent: Nov. 29, 2022

(54) WELDING DEVICE AND WELDING METHOD

(71) Applicant: Kobe Steel, Ltd., Kobe (JP)

(72) Inventors: Naoki Kawabe, Fujisawa (JP); Tokuji Maruyama, Fujisawa (JP); Minoru Miyata, Fujisawa (JP); Kei Yamazaki, Fujisawa (JP); Reiichi Suzuki, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 961 days.

(21) Appl. No.: 15/545,839

(22) PCT Filed: Jan. 4, 2016

(86) PCT No.: PCT/JP2016/050043
§ 371 (c)(1),
(2) Date: Jul. 24, 2017

(87) PCT Pub. No.: WO2016/121410
PCT Pub. Date: Aug. 4, 2016

(65) Prior Publication Data
US 2018/0015561 A1    Jan. 18, 2018

(30) Foreign Application Priority Data

Jan. 26, 2015 (JP) .............................. JP2015-012565
Mar. 19, 2015 (JP) .............................. JP2015-055710

(51) Int. Cl.
*B23K 9/173* (2006.01)
*B23K 9/32* (2006.01)
(Continued)

(52) U.S. Cl.
CPC .............. *B23K 9/173* (2013.01); *B23K 9/295* (2013.01); *B23K 9/32* (2013.01); *B23K 9/324* (2013.01);
(Continued)

(58) Field of Classification Search
CPC ........ B23K 9/325; B23K 9/173; B23K 9/164; B23K 9/167; B23K 9/295; B23K 35/0266;
(Continued)

(56) References Cited

U.S. PATENT DOCUMENTS 4,095,080 A * 6/1978 Ueyama ................. B23K 9/164
                                                             219/137.41
5,686,002 A * 11/1997 Flood ................... B23K 9/0286
                                                             219/137 R
(Continued)

FOREIGN PATENT DOCUMENTS

CN     101616777 A  * 12/2009 ......... H05K 13/0409
CN     203304753 U     11/2013
(Continued)

OTHER PUBLICATIONS

English translation of CN203304753 (Year: 2013).*
(Continued)

*Primary Examiner* — Chris Q Liu
(74) *Attorney, Agent, or Firm* — Oblon, McClelland, Maier & Neustadt, L.L.P.

(57) ABSTRACT

A welding system includes a welding torch that welds a workpiece by using a wire, a suction device that sucks shielding gas, and a sucked shielding gas supply path for allowing the sucked shielding gas to flow, wherein the welding torch includes a contact chip that guides the wire, a shielding gas supply nozzle that supplies the shielding gas to a weld zone, and a suction nozzle that surrounds a periphery of the wire protruding from the contact chip, and is opened toward a tip of the wire to suck the shielding gas.

12 Claims, 20 Drawing Sheets

(51) Int. Cl.
*B23K 9/29* (2006.01)
*B23K 35/02* (2006.01)
*B23K 35/36* (2006.01)
*B23K 35/30* (2006.01)

(52) U.S. Cl.
CPC .......... *B23K 35/0266* (2013.01); *B23K 35/36* (2013.01); *B23K 35/30* (2013.01); *B23K 35/3053* (2013.01)

(58) Field of Classification Search
CPC .... B23K 35/0288; B23K 35/22; B23K 35/30; B23K 35/3053; B23K 35/3066; B23K 35/3073; B23K 35/3602; B23K 35/3605; B23K 35/3607; B23K 35/3608; B23K 35/368; B23K 35/38; B23K 9/0061; B23K 9/0286; B23K 9/04; B23K 9/0956; B23K 9/16; B23K 9/291; B23K 9/296; B23K 9/32
USPC ... 219/74, 121.5, 137.41, 137 R, 75, 121.36, 219/121.47, 121.48, 121.49, 121.51, 219/121.52, 121.53, 121.59, 137.2, 219/146.23, 61, 76.16
See application file for complete search history.

(56) References Cited

U.S. PATENT DOCUMENTS

| | | | |
|---|---|---|---|
| 6,380,515 B1 | 4/2002 | Knoll et al. | |
| 2006/0226136 A1 | 10/2006 | Zamuner | |
| 2009/0017328 A1 | 1/2009 | Katoh et al. | |
| 2010/0276396 A1 | 11/2010 | Cooper et al. | |
| 2014/0151343 A1* | 6/2014 | Foret | H05H 1/48 219/121.5 |
| 2015/0314397 A1 | 11/2015 | Jeong et al. | |

FOREIGN PATENT DOCUMENTS

| | | | | |
|---|---|---|---|---|
| CN | 203899800 U | 10/2014 | | |
| DE | 10 2011 106 684 A1 | 1/2013 | | |
| EP | 2556914 A1 * | 2/2013 | ............ | B23K 9/325 |
| GB | 1 512 850 A | 6/1978 | | |
| JP | 51-78756 A | 7/1976 | | |
| JP | 57-11681 U | 1/1982 | | |
| JP | 62-146582 U | 9/1987 | | |
| JP | 2-59876 U | 5/1990 | | |
| JP | 7-266053 A | 10/1995 | | |
| JP | 2002-506736 A | 3/2002 | | |
| JP | 2010-131637 A | 6/2010 | | |
| JP | 5051562 B1 | 10/2012 | | |
| JP | 5494737 B2 | 5/2014 | | |
| KR | 1996-0004929 Y1 | 6/1996 | | |
| KR | 1999-0004929 Y1 | 6/1996 | | |
| KR | 10-2009-0040251 A | 4/2009 | | |
| KR | 10-1021397 B1 | 3/2011 | | |
| SU | 186055 A | 9/1966 | | |
| SU | 390898 A | 7/1973 | | |
| SU | 1174207 A | 8/1985 | | |
| WO | WO 2014/104731 A1 | 7/2014 | | |

OTHER PUBLICATIONS

English translation of EP-2556914-A1 (Year: 2013).*
English translation of CN-101616777-A (Year: 2009).*
International Search Report dated Mar. 15, 2016 in PCT/JP2016/050043 filed Jan. 4, 2016.
Extended European Search Report dated Sep. 14, 2015 in Patent Application No. 16743014.9, 9 pages.
International Preliminary Report on Patentability and Written Opinion dated Aug. 10, 2017 in PCT/JP2016/050043 (submitting English translation only).
"Welding Manual", China Mechanical Engineering Associations and welding Associations editing, Third Edition, vol. 1, Mechanical Industry Press, Oct. 2007, pp. 222-223 and cover page, (with its partial English translation).

* cited by examiner

| SUCTION AMOUNT (LITERS/min) | 5 | 10 | 15 | 20 | 25 |
|---|---|---|---|---|---|
| DIFFUSIBLE HYDROGEN AMOUNT IN WELD METAL (MILLILITERS/100 g) | 3.0 | 2.8 | 2.6 | 2.5 | 2.5 |
| NITROGEN AMOUNT IN WELD METAL (ppm) | 50 | 50 | 50 | 80 | 150 |
| FUME SUCTION RATIO (%) | 3 | 5 | 8 | 11 | 15 |

Fig.17

| SUCTION NOZZLE CROSS-SECTION AREA (mm²) | SUCTION FLOW RATE (LITERS/MIN.) | | | |
|---|---|---|---|---|
| | 3 | 5 | 10 | 15 |
| 11.4 | 4.4 | 7.3 | 14.6 | 21.9 |
| 18.5 | 2.7 | 4.5 | 9.0 | 13.5 |
| 27.1 | 1.8 | 3.1 | 6.1 | 9.2 |

Fig.18

| SUCTION NOZZLE CROSS-SECTION AREA (mm²) | SUCTION FLOW RATE (LITERS/MIN.) | | | |
|---|---|---|---|---|
| | 3 | 5 | 10 | 15 |
| 11.4 | 3.2 | 2.4 | 2.4 | 2.5 |
| 18.5 | 4.0 | 2.8 | 2.3 | 2.4 |
| 27.1 | 4.4 | 4.0 | 2.5 | 2.5 |

WELDING DEVICE AND WELDING METHOD

CROSS-REFERENCE TO RELATED APPLICATIONS

This is a national phase application in the United States of International Patent Application No. PCT/JP2016/050043 with an international filing date of Jan. 4, 2016, which claims priorities of Japanese Patent Application Nos. 2015-012565 filed on Jan. 26, 2015 and 2015-055710 filed on Mar. 19, 2015 the entire contents of each of which are incorporated herein by reference.

TECHNICAL FIELD

The present invention relates to a welding device and a welding method.

BACKGROUND ART

In welding industry, hydrogen embrittlement and hydrogen cracking of the weld metal due to diffusible hydrogen (hydrogen atoms H) in the weld metal become problem. The diffusible hydrogen in the weld metal collects in a minute space or a grain boundary of a steel structure to become hydrogen molecules ($H_2$), and the volume expands, and this expansion pressure causes cracking, which results in destruction of a structure. In such hydrogen cracking, while hydrogen cracking sensitivity is enhanced as the strength of steel is increased, high tensile steel having high strength recently tends to be used in welding.

FIG. 20 is a diagram for illustrating a process of absorbing diffusible hydrogen in weld metal. FIG. 20 illustrates a wire, assuming that a flux cored wire (FCW (Flux Cored Wire)) which is a wire containing flux is used as the wire. FIG. 21 is a diagram illustrating a cross-section of the flux cored wire.

A wire 201 which is the flux cored wire includes a steel hoop 202 forming an outer periphery, and a central part 203. In a case of the flux cored wire, the central part 203 contains metal or metal powers such as alloy, and flux. Then, the wire 201 is sent through a contact chip 208. At the same time as the above, a welding current flows from the contact chip 208 to the wire 201, and the wire 201 is melted by an arc 209 at a tip of the wire 201 to become weld metal 210. At this time, the welding current flows in a wire protruding section 211 of the wire 201 which protrudes from the contact chip 208, and therefore resistance heating is generated, and a temperature rises. For example, this temperature rise sometimes reaches 100° C. at a position of the wire from a tip of the contact chip 208 by about 5 mm, and sometimes rises up to about 600° C. in the vicinity of the wire tip from the tip of the contact chip 208 by 20 mm.

When the temperature of the wire protruding section 211 exceeds 100° C. and rises, hydrogen sources 205 of a surface of the wire 201 are first vaporized to be discharged from the wire 201. Then, the central part 203 is heated by heat conduction from the heated steel hoop 202, the hydrogen sources 205 in the flux and in the metal powers are also vaporized to be discharge outside the wire 201 through a seam 204 as a joint. Some of the hydrogen sources 205 discharged from the wire 201 flows in the direction illustrated by the arrows 213 to be guided to the arc 209 by a flow of shielding gas supplied from a nozzle 206 to a weld zone in a case of arc plasma gas and gas shield arc welding (in the direction illustrated in the arrows 207). The arc 209 has a high temperature of thousands of degrees, and therefore the hydrogen sources 205, for example, $H_2O$, are dissociated to become diffusible hydrogen 212, and are absorbed in globules in an arc column and in the weld metal 210 to enter the weld metal 210.

Thus, the hydrogen sources that exist on the surface of the wire, and the hydrogen sources included in the flux and the metal powers used for the wire are vaporized in a wire protruding section heated to a high temperature. Then, the vaporized hydrogen sources are carried into the arc column and the vicinity of the arc column by the flow of the arc plasma gas and the shielding gas supplied in a case of gas shield arc welding, and are dissociated to become hydrogen atoms (that is, diffusible hydrogen), so that hydrogen atoms are absorbed in the weld metal.

As a countermeasure for hydrogen embrittlement and hydrogen cracking generated by diffusible hydrogen, in order to facilitate discharge of diffusible hydrogen from the weld metal to the outside, preheating (heating a welding steel material before welding) or post heating (heating the weld zone after welding) is sometimes performed. Additionally, in a case where the flux cored wire is used in welding, a method for reducing diffusible hydrogen by adding fluoride such as $CaF_2$ and $Na_3 AlF_6$ to the flux is used. Furthermore, a method for mixing a very small amount of CF4 with shielding gas supplied in gas shield arc welding is proposed.

For example, JP 2002-506736 A discloses a device for performing welding work, which includes a center member capable of guiding a welding wire connectable to a voltage source inside, a takeout member disposed outside the center member in order to take out weld fumes, a gas supply member disposed outside the takeout member in order to supply gas, as a device for taking out weld fumes which are inconvenience substances for a welder.

SUMMARY OT THE INVENTION

Problems to be Solved by the Invention

The hydrogen sources in the welding wire are oil and moisture adhered to a welding wire surface, moisture adhered to metal powers or flux contained in a flux cored wire or a metal cored wire (MCW (Metal Cored Wire)). Generally, the number of hydrogen sources adhered to the flux or the metal powers is relatively larger than the number of hydrogen sources adhered to the welding wire surface. Therefore, in order to reduce the hydrogen sources adhered to the flux and the metal powers, a method for drying flux and metal particles at a high temperature to remove hydrogen sources before a wire is manufactured is sometimes employed. Additionally, it is necessary to prevent moisture absorption during a manufacturing process, but significant cost is required. Furthermore, even after manufacturing, moisture is absorbed from air during storage and during work at a humid welding site, and therefore a variety of obstacles exist in order to reduce the hydrogen sources.

In a case where preheating or post heating is performed as the countermeasure of hydrogen embrittlement and hydrogen cracking, heating is performed at 150° C. to 250° C., so that significant energy cost and labor are required. Additionally, there is a problem that the work is performed at a high temperature, and an oppressive burden is imposed on a welding worker. In a case where fluoride is added to the flux, as an amount of an additive is increased, diffusible hydrogen is not sometimes sufficiently reduced in order to deteriorate stability of the arc. Furthermore, also in the method for mixing CF4 with the shielding gas, there are a problem of stability, a problem of the deterioration of the stability of the arc, and it is said that there are obstacles in spread. An object of the present invention is to reduce the amount of the diffusible hydrogen in the weld metal.

Means for Solving the Problems

For such an object, the present invention is a welding method for performing welding while supplying shielding gas to a weld zone, the welding method comprising: sucking gas containing hydrogen source discharged from a welding wire, from an arc column and a periphery of the arc column, by using a suction nozzle, the arc column being generated at a periphery of the welding wire protruding from a contact chip and in a tip of the welding wire; and mixing the sucked gas with new shielding gas to perform welding. Additionally, the welding wire can be a flux cored wire containing fluoride.

Furthermore, in another aspect, the present invention is a welding device including: a contact chip that guides a welding wire, and supplies a welding current to the welding wire; a suction section that surrounds a periphery of the welding wire protruding from the contact chip, and is opened toward a tip of the welding wire to suck gas; a mixing section that mixes the gas sucked from the suction section with new shielding gas; and a shielding gas supply nozzle that supplies the gas mixed in the mixing section to a weld zone. Additionally, the suction section can suck a hydrogen source discharged from the welding wire, from a periphery of the welding wire protruding from the contact chip, an arc column generated in the tip of the welding wire, and a periphery of the arc column, and reduce a diffusible hydrogen amount in weld metal. Furthermore, an ejector can be provided as the suction section and the mixing section, and the ejector can suck gas by utilizing a flow of the new shielding gas. The suction section can include a vacuum pump. The suction section includes a flowmeter for monitoring a suction flow rate. The suction section can include a filter that removes a fume sucked together with the hydrogen source. Furthermore, the suction section can include a suction amount control device that controls a suction amount at a constant level. The suction section can include a suction amount abnormality detection device that generates an alarm or stops welding when abnormality of a suction amount is detected. This welding device can be the welding torch. In a case where the welding device is the welding torch, the suction section can be a path for allowing the new shielding gas to flow, and include a driving nozzle that jets the shielding gas, the mixing section can include a mixer tube that mixes the gas sucked from the suction section with shielding gas jetted from the driving nozzle, and the shielding gas supply nozzle can be connected to an outlet of the mixer tube, and supply the gas mixed in the mixer tube to the weld zone.

In another aspect, the present invention is a welding device including: a contact chip that guides a welding wire, and supplies a welding current to the welding wire; a suction section that surrounds a periphery of the welding wire protruding from the contact chip, has an opening directed toward a tip of the welding wire, and sucks gas by utilizing a flow of new shielding gas supplied from outside; a mixing section that mixes the gas sucked from the suction section with the new shielding gas; and a shielding gas supply nozzle that supplies the gas mixed in the mixing section to a weld zone.

In another aspect, the present invention is a welding method for performing welding by consumable electrode type gas shield arc welding or self-shield arc welding, the welding method comprising: sucking gas containing hydrogen source discharged from a welding wire, from an arc column and a periphery of the arc column, by using a suction nozzle, the arc column being generated at a periphery of the welding wire protruding from a contact chip and in a tip of the welding wire; and exhausting the sucked hydrogen source to outside of a weld zone, thereby reducing a diffusible hydrogen amount in weld metal by exhausting the sucked hydrogen source to outside of a weld zone. The welding wire can be a flux cored wire containing fluoride. Furthermore, a flow rate of gas containing the hydrogen source sucked from the suction nozzle can be 80% or less of a flow rate of gas supplied from a shielding gas supply nozzle. Flow velocity of gas containing the hydrogen source sucked from the suction nozzle can be 1 time or more of flow velocity of gas supplied from a shielding gas supply nozzle.

Furthermore, in another aspect, the present invention is a welding device including: a contact chip that guides a welding wire; a shielding gas supply nozzle that supplies shielding gas to a weld zone; and a suction nozzle that surrounds a periphery of the welding wire protruding from the contact chip, and is opened toward a tip of the welding wire to suck gas. This welding device can further include a suction means for sucking gas containing a hydrogen source sucked from the suction nozzle. Additionally, the suction means can include an ejector that sucks gas by utilizing a flow of compressed gas. Furthermore, the suction means can include a vacuum pump. The suction means can include a flowmeter for monitoring a suction flow rate. The suction means can include a filter that removes a fume sucked together with the hydrogen source. Additionally, the suction means can include a suction amount control device that controls a suction amount at a constant level. Furthermore, the suction means can include a suction amount abnormality detection device that generates an alarm or stops welding when abnormality of a suction amount is detected. The suction means can include a suction means activation control device that receives a welding start signal for informing start of welding, and a welding stop signal for informing stop of welding, and starts or stops suction by the suction means based on the received welding start signal and the received welding stop signal.

In another aspect, the present invention is a welding device including: a contact chip that guides a welding wire; a shielding gas supply nozzle that supplies shielding gas to a weld zone; and a suction nozzle that reduces a diffusible hydrogen amount in weld metal by sucking a hydrogen source discharged from the welding wire to exhaust a hydrogen source to outside of the weld zone.

Effect of the Invention

According to the present invention, it is possible to reduce an amount of diffusible hydrogen in weld metal.

BRIEF DESCRIPTION OF THE DRAWINGS

FIG. 16 is a chart illustrating an example of a measurement result in a case where a suction amount is changed;

FIG. 17 is a chart illustrating a suction flow rate in a case where the cross-section area of an opening of a suction nozzle, and a suction flow rate are changed;

FIG. 18 is a chart illustrating a diffusible hydrogen amount measured in the case where the cross-section area of the opening of the suction nozzle, and the suction flow rate are changed;

DESCRIPTION OF EMBODIMENTS

Hereinafter, embodiments of the present invention will be described in detail with reference to the drawings.

<Configuration of Welding System>

A welding system 100 according to this embodiment is a device that performs welding by consumable electrode type gas shield arc welding. The consumable electrode is an electrode that dissolves by arc heat in arc welding. The gas shield arc welding is a welding method for shielding a weld zone from outside air by jetted shielding gas to perform welding. Then, the welding system 100 sucks shielding gas containing hydrogen sources in the vicinity of the wire protruding length of the shielding gas jetted to the weld zone, mixes the sucked shielding gas with new shielding gas, and further jets the mixed shielding gas (hereinafter referred to as mixed shielding gas) to the weld zone to perform welding.

Figure 1:
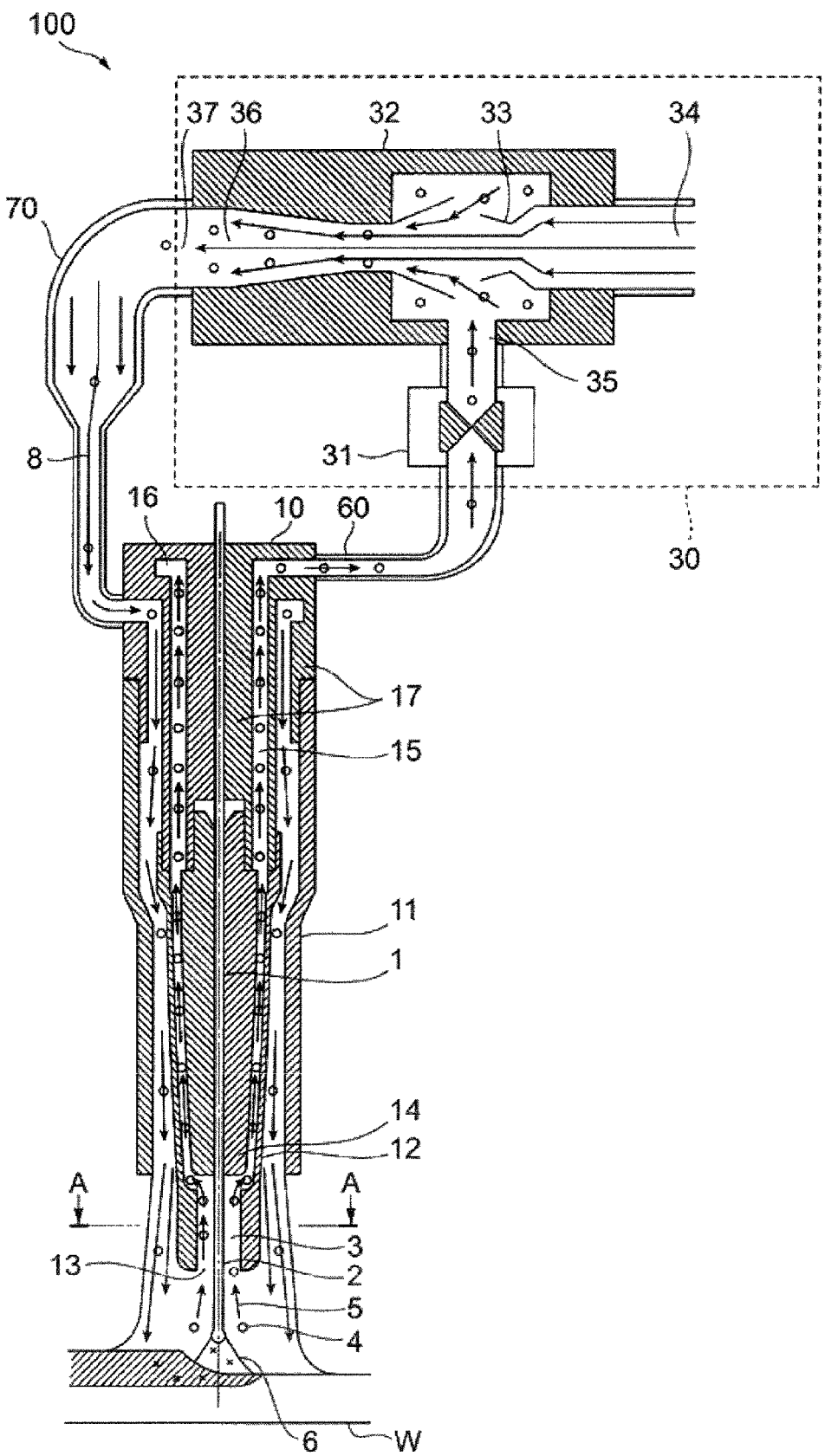
FIG. 1 is a diagram illustrating an example of a schematic configuration of a welding system according to this embodiment.

FIG. 1 is a diagram illustrating an example of a schematic configuration of a welding system 100 according to this embodiment. As illustrated in FIG. 1, the welding system 100 according to this embodiment includes a welding torch 10 that welds a workpiece W by using a wire (welding wire) 1, a suction device 30 that sucks shielding gas to mix the sucked shielding gas with new shielding gas, a sucked shielding gas supply path 60 for allowing the sucked shielding gas to flow, and a mixed shielding gas supply path 70 for allowing the mixed shielding gas to flow.

The welding torch 10 supplies power to the wire 1 by a welding current supplied from a welding power supply (not illustrated) to weld the workpiece W. As the wire 1, for example, a flux cored wire having a central part added with metal powers and flux, a metal cored wire having a central part mainly added with metal powers, or a solid wire composed of alloy such as steel is used. The welding torch 10 includes a shielding gas supply nozzle 11, a suction nozzle 12, a contact chip 14, a suction path 15, and a chip body 17.

The suction device 30 sucks shielding gas from the suction nozzle 12 of the welding torch 10 to mix the sucked shielding gas with new shielding gas. Herein, the new shielding gas is supplied from an external shielding gas supply device (not illustrated) of a shielding gas cylinder or the like. As the suction device 30, for example, suction capacity of about 25 liters/min is only needed, and a device which is small size and does not need large energy but is supplied at a low cost can be employed. The suction device 30 has a flow rate control valve 31 and an ejector 32.

The sucked shielding gas supply path 60 is, for example, a rubber tube, and connects the suction path 15 of the welding torch 10 and the suction device 30 to become a path for allowing sucked shielding gas to flow.

The mixed shielding gas supply path 70 connects an exhaust port 37 of the suction device 30 described below, and the chip body 17 of the welding torch 10 to become a path for allowing mixed shielding gas to flow.

In this embodiment, the welding system 100 is used as an example of the welding device. Additionally, the welding torch 10 including the contact chip 14, the shielding gas supply nozzle 11, and the suction nozzle 12 is used as an example of the welding device. In this embodiment, in a case where the welding system 100 is used as an example of the welding device, the suction device 30, and the sucked shielding gas supply path 60 are used as an example of a suction means. Additionally, the suction device 30, the sucked shielding gas supply path 60, the suction nozzle 12, and the suction path 15 are used as an example of a suction section. Furthermore, the suction device 30 is used as an example of a mixing section.

Now, a configuration of the welding torch 10 will be described.

The shielding gas supply nozzle 11 has a cylindrical shape, and is fixed by being fitted into an opening side of the chip body 17 formed in a cylindrical shape, the opening side being a lower side in FIG. 1. This shielding gas supply nozzle 11 supplies mixed shielding gas to the weld zone. The shielding gas supply nozzle 11 is formed in a cylindrical shape, and therefore the mixed shielding gas is supplied so as to be shielded from outside air by surrounding the weld zone. The shielding gas supply nozzle 11 is connected to the suction device 30 through the chip body 17 and the mixed shielding gas supply path 70.

Figure 2:
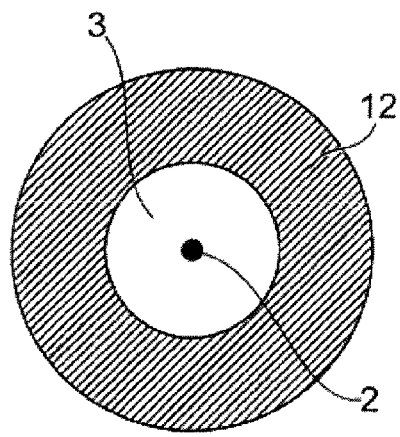
FIG. 2 is a sectional view taken along the A-A part of FIG. 1 in the welding system.

The suction nozzle 12 is disposed inside the shielding gas supply nozzle 11, has a cylindrical shape, and is fixed by being fitted into the opening side of the chip body 17, the opening side being the lower side of the FIG. 1. Additionally, the suction nozzle 12 has a structure in which the periphery 3 of a wire protruding section 2 of the wire 1, which protrudes from the contact chip 14, is surrounded, and has an opening 13 toward a tip of the wire 1. FIG. 2 is a sectional view taken along the A-A part of FIG. 1 in the welding system 100. As illustrated in FIG. 2, the suction nozzle 12 exists so as to surround the periphery 3 of the wire protruding section 2.

Herein, the suction nozzle 12 is opened toward the tip direction of the wire 1, that is, is opened toward the direction of an arc 6, and sucks shielding gas containing hydrogen sources 4 discharged in the vicinity of the wire tip. The suction nozzle 12 sucks, so that the shielding gas containing the hydrogen sources 4 flows in the direction of the arrows 5 which are the direction toward the outside of the weld zone to be sucked, and is exhausted to the outside of the weld zone.

In order to suck the hydrogen sources 4 discharged in the vicinity of the wire tip, the suction nozzle 12 may be formed so as to increase the length thereof to surround the wire tip, but there is a possibility that the suction nozzle 12 is dissolved by the arc heat. Therefore, the suction nozzle 12 has a length in consideration of an influence of the arc heat, and is opened toward the wire tip. As the suction nozzle 12, for example, copper alloy excellent in heat conduction, or ceramics excellent in heat resistance is used. Furthermore, in order to prevent adhesion of spatters, a chromium-plated suction nozzle or the like may be used.

The contact chip 14 is disposed inside the suction nozzle 12, has a cylindrical shape, and is fixed by being fitted into the opening side of the chip body 17, the opening side being the lower side in FIG. 1. This contact chip 14 guides the wire 1, and supplies a welding current to the wire 1. A wire feed path having a diameter contactable to the wire 1 is formed inside the contact chip 14, and power is supplied to the wire 1. The contact chip 14 is detachably mounted, and is replaced in a case where the contact chip 14 is consumed by long time use.

The suction path 15 leads the shielding gas sucked by the suction nozzle 12 to the suction device 30. This suction path 15 is a passage formed by boring the chip body 17 to form, for example, four holes each having a diameter of 1.5 mm with a drill, the passages by the four holes are merged at a merging groove 16 in the circumferential direction to be thereafter connected to the suction device 30 through the sucked shielding gas supply path 60. However, the suction path 15 is not limited to such a configuration, and any path that leads the shielding gas or the hydrogen sources 4 from the suction nozzle 12 to the suction device 30 may be employed.

The chip body 17 is a body of the welding torch 10, has a cylindrical shape, and supports the shielding gas supply nozzle 11, the suction nozzle 12, and the contact chip 14.

Now, a configuration of the suction device 30 will be described.

The flow rate control valve 31 is composed of, for example, a needle valve, includes an actuator such as a motor, and controls a suction flow rate. The flow rate control valve 31 is provided between a suction port 35 of the ejector 32 described below, and the sucked shielding gas supply path 60.

The ejector 32 has a T-like duct configuration, and has a function of a general ejector. That is, shielding gas flows in the horizontal direction from the external shielding gas supply device, so that flow velocity increases at a thinned part in a tube, a tube corresponding to a vertical line of a T-shape becomes a suction port, and the shielding gas is sucked through the suction nozzle 12. The ejector 32 includes a driving nozzle 33, a gas supply port 34, the suction port 35, the mixer tube 36, and the exhaust port 37.

In this ejector 32, the gas supply port 34 is connected to the external shielding gas supply device, and new shielding gas is supplied from the shielding gas supply device. Additionally, the new shielding gas led from the gas supply port 34 to the driving nozzle 33 is jetted toward the mixer tube 36. The suction port 35 is finally connected to the suction nozzle 12 through the sucked shielding gas supply path 60 and the suction path 15. That is, the shielding gas containing the hydrogen sources 4 sucked from the suction nozzle 12 is led to the suction port 35.

Then, the new shielding gas is jetted toward the mixer tube 36, so that shielding gas containing the hydrogen sources 4 in the suction port 35 and the new shielding gas are mixed with each other in the mixer tube 36. The mixed shielding gas is sent to the exhaust port 37, flows in the direction illustrated by the arrows 8, and is led to the shielding gas supply nozzle 11 through the mixed shielding gas supply path 70 connected to the exhaust port 37. Then, the mixed shielding gas is supplied to the weld zone, and welding is performed.

Thus, the ejector 32 has a function of sucking the shielding gas containing the hydrogen sources 4, and also has a function of mixing the sucked shielding gas and the new shielding gas with each other. Additionally, the ejector 32 can use the new shielding gas supplied from the external shielding gas supply device conventionally used, as a driving source, and therefore has characteristics that compressed gas or the like serving as the driving source does not need to be drawn from another system, a structure is simple and has fewer failures, and an electric driving source is not needed unlike a vacuum pump. Thus, it is said that in the ejector 32, a facility is inexpensive, and maintainability is excellent.

Supply pressure when the new shielding gas is generally supplied is about 0.1 to 0.3 megapascals (unit of pressure: MPa), and the flow rate of the new shielding gas usually used is about 20 to 25 liters/min. In such a condition, when the sizes of the driving nozzle 33 and the mixer tube 36 are properly selected, it is easy that the suction flow rate of shielding gas is secured by about 20 liters/min. Furthermore, the flow rate control valve 31 is used, so that it is possible to adjust a desired suction flow rate by a welding worker.

Furthermore, the supply of the new shielding gas is started by turning on a shielding gas solenoid valve (not illustrated) at the time of welding start in welding power supply, and is stopped by turning off the shielding gas solenoid valve at the time of welding stop. Therefore, the driving of the ejector 32 is performed in synchronization with welding, and suction of the shielding gas containing the hydrogen sources 4 is automatically performed in synchronization with welding without operation by the welding worker. Therefore, the ejector 32 is used, so that the suction device 30 does not need to be provided with a suction start and suction stop function.

In a case where the ejector 32 is used, it is required that the pressure of the exhaust port 37 is lower than the pressure of the gas supply port 34. Therefore, when the cross-section area of the mixed shielding gas supply path 70 connected to the exhaust port 37 is excessively reduced, or the path length is excessively increased, it becomes difficult to secure the suction flow rate. From an experiment, it is confirmed that a sufficient suction amount can be secured in a case where the cross-section area of the mixed shielding gas supply path 70 is 28 mm$^2$, and the path length is 6 m, and it is said that no practical problem is caused.

Thus, in the welding system 100 according to this embodiment, the suction device 30 sucks shielding gas from the periphery 3 of the wire protruding section 2 and the vicinity of the tip of the wire 1 by the suction nozzle 12. Then, the shielding gas containing the hydrogen sources 4 discharged from the heated wire 1 flows in the direction of the arrows 5 toward the outside of the weld zone to be sucked. In a case where the suction using the suction device 30 is not performed, the hydrogen sources 4 are directly above the arc 6, and therefore most of the hydrogen sources 4 are led to the arc 6 to be absorbed in the weld metal. On the other hand, use of the welding system 100 according to this embodiment inhibits the hydrogen sources 4 from flowing to the arc 6 to become diffusible hydrogen inside the arc 6, and being absorbed in the weld metal, so that the amount of the diffusible hydrogen in the weld metal is reduced. The amount of the diffusible hydrogen in the weld metal is reduced, so that hydrogen embrittlement and hydrogen cracking in the weld metal are prevented.

In the welding system 100 according to this embodiment, the suction device 30 sucks the shielding gas, so that the shielding gas containing the hydrogen sources 4 are mixed with the new shielding gas in the suction device 30. In the sucked shielding gas, the hydrogen sources 4 are concentrated on the central part of the shielding gas. However, the shielding gas is mixed with the new shielding gas, the concentration of the hydrogen sources at the central part becomes one severalth. Furthermore, the ratio of the mixed shielding gas led into the arc 6 is one severalth of the mixed shielding gas supplied from the shielding gas supply nozzle 11. Therefore, it is said that the ratio of the hydrogen sources 4 finally led into the arc 6 is about one tenth or less.

Therefore, the sucked shielding gas is mixed with the new shielding gas, so that the hydrogen sources 4 discharged from the wire protruding section 2 diffuses into the entire shielding gas, and even when the shielding gas is mixed, the reduction effect of diffusible hydrogen is obtained. Additionally, the shielding gas once supplied is reused, so that the amount of shielding gas externally supplied is reduced in order to shield the weld zone from outside air.

Generally, the diffusible hydrogen in the weld metal is reduced by 1 milliliter/100 g, so that a necessary preheating temperature can be lowered by about 25° C. For example, in a case where the diffusible hydrogen is reduced by 4 milliliters/100 g, in welding requiring a preheating temperature of 125° C., the preheating temperature can be lowered by 100° C., and the preheating temperature becomes 25° C., so that preheating is not needed consequently. Additionally, for example, also in welding requiring a preheating temperature of 200° C., preheating up to 100° C. is enough. Such preheating temperature reduction obtains economic effects such as saving of auxiliary energy, reduction in labor and time necessary for preheating. Additionally, hard working environment of 200° C. preheating work is improved.

Furthermore, although the wire 1 absorbs moisture by storage environment, moisture absorption is visually unclear, and therefore thorough management of the storage environment is requested. The diffusible hydrogen amount in the weld metal is reduced by use of the welding system 100 according to this embodiment, and therefore the management level of the storage environment is reduced, and even if moisture is absorbed by a human error, the influence of such an error is relaxed.

<Another Configuration Example of Suction Device>

Now, another configuration example of the suction device 30 will be described. FIGS. 3 to 7 each illustrate another configuration example of the suction device 30.

Figure 3:
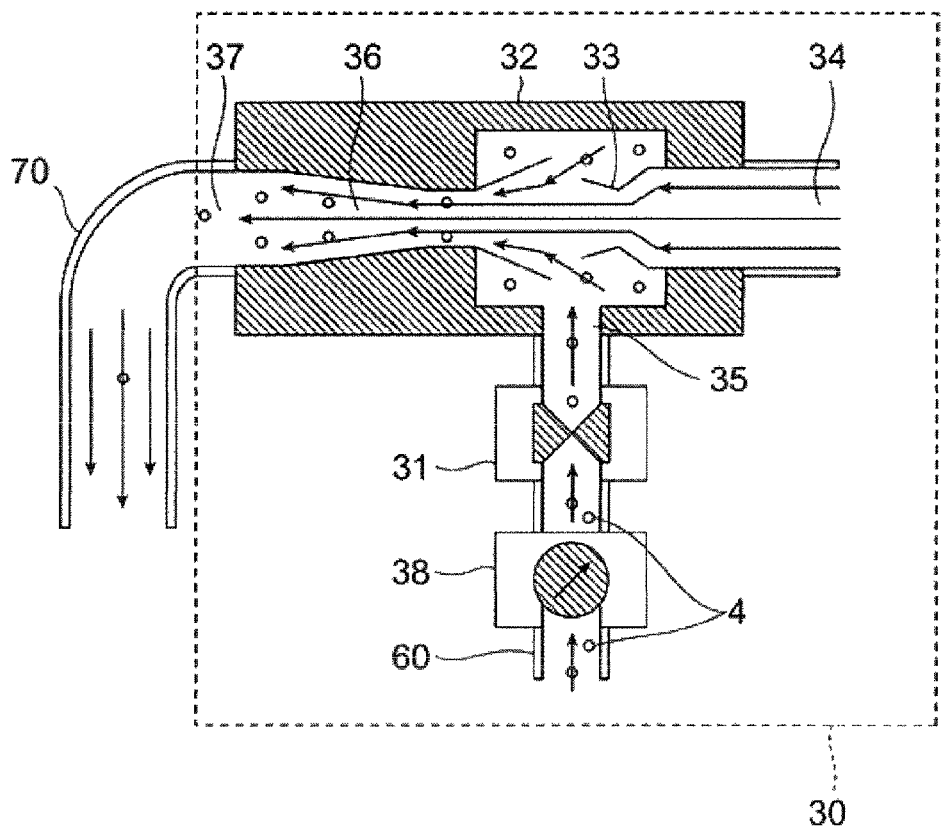
FIG. 3 is a diagram illustrating another configuration example of a suction device.

As illustrated in FIG. 3, the suction device 30 may include a flowmeter 38 for monitoring a suction flow rate. The flowmeter 38 is disposed between the suction port 35 and the sucked shielding gas supply path 60. As this flowmeter 38, for example, a float-type (area type) flowmeter, or a flowmeter which outputs an analog signal or a digital signal in proportion to suction flow rate is used, and commercially available known flowmeter may be used.

Then, the welding worker may adjust the flow rate control valve 31 and the like based on an indicated value of the flowmeter 38 to secure a desired flow rate. Additionally, the welding worker may monitor appropriateness of the suction flow rate based on the indicated value of the flowmeter 38. Thus, suction of hydrogen sources 4 can be ensured by use of the flowmeter 38.

Figure 4:
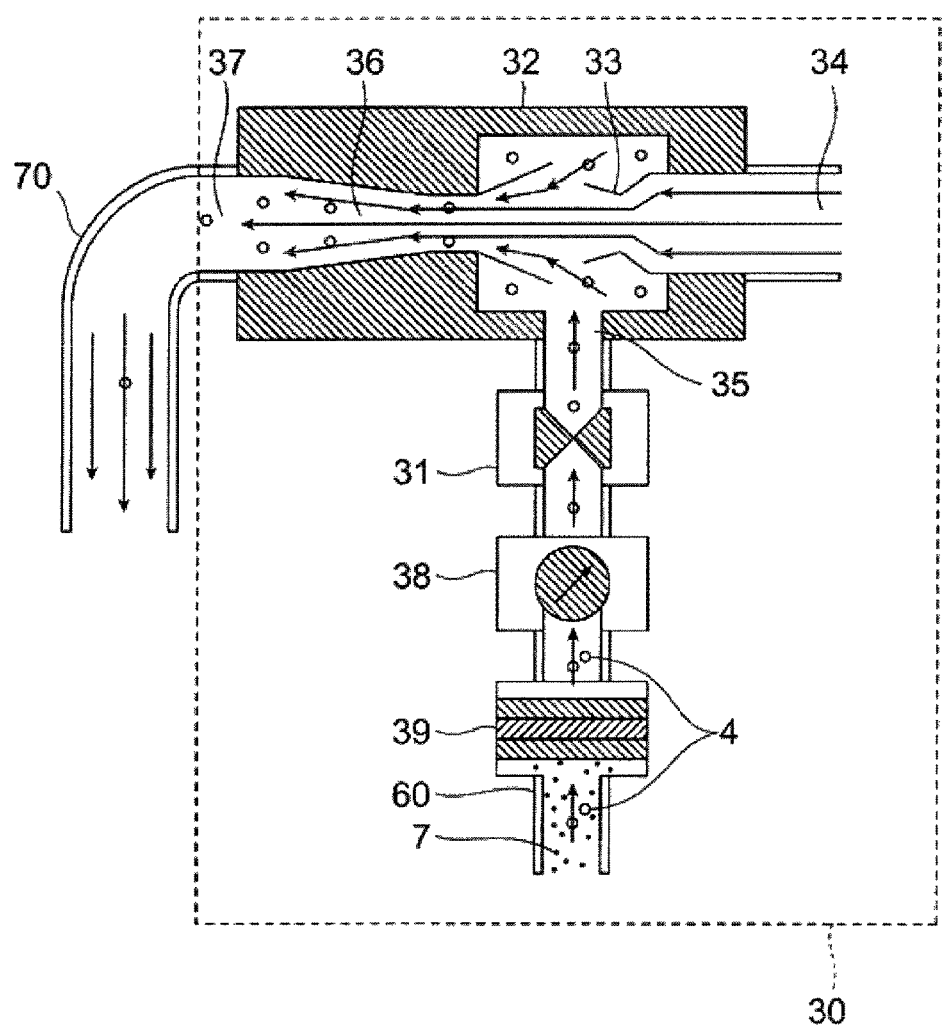
FIG. 4 is a diagram illustrating another configuration example of the suction device.

As illustrated in FIG. 4, the suction device 30 may include a filter 39. The filter 39 is disposed between the suction port 35 and the sucked shielding gas supply path 60, and is used in order to remove fumes 7 sucked along with the hydrogen sources 4. As a raw material of the filter 39, for example, nonwoven fabric of a chemical fiber, porous ceramics, metal fibers, or the like is used. Additionally, the fumes 7 are fine particles each having a size of about 1 μm, and therefore the filter 39 preferably has small meshes.

In welding, metal and an oxide are evaporated by the arc 6 with a high temperature, and the fumes 7 are generated. The generated fumes 7 are a small amount, and is sucked along with the hydrogen sources 4 by the suction device 30. As described below, it is confirmed from an experiment that the amount of the sucked fumes 7 is small, namely about 3% of all generated amount of the fumes 7 in a case where the suction amount of the suction device 30 is 5 liters/min.

However, for example, the fumes 7 are sometimes adhered to a float of the flowmeter 38 to cause malfunction, or are sometimes accumulated at a narrow place of the flow rate control valve 31 to cause adjustment failure. For example, the fumes 7 are sometimes accumulated on the ejector 32 to cause lowering of suction force. Such events caused by the fumes 7 each become a factor that inhibits suction of the hydrogen sources 4. In order to solve these problems, the filter 39 functions, and the filter 39 is used, so that the ejector 32, the flowmeter 38, the flow rate control valve 31, and the like are protected.

Figure 5:
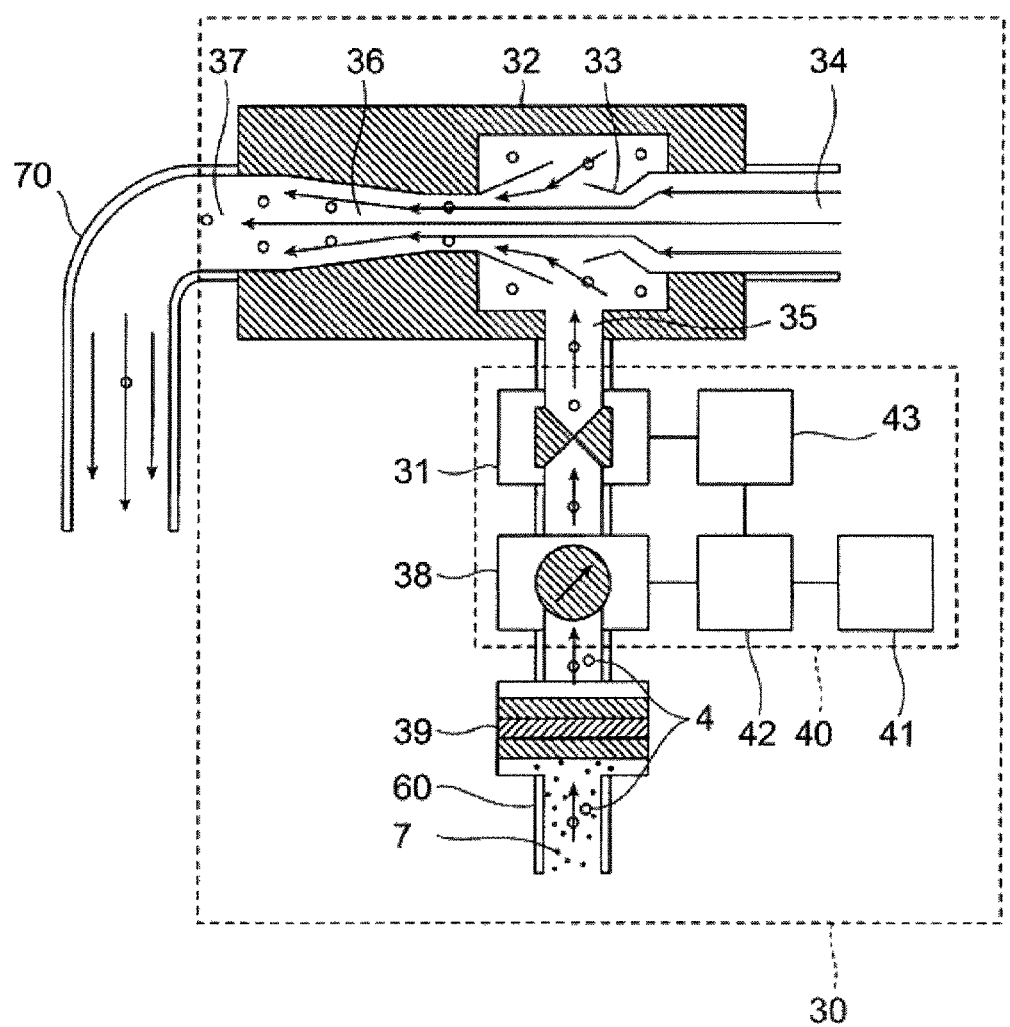
FIG. 5 is a diagram illustrating another configuration example of the suction device.

As illustrated in FIG. 5, the suction device 30 may include a suction amount control device 40 for controlling a suction amount of shielding gas at a constant level. The suction amount control device 40 includes a flow rate control valve 31, a flowmeter 38 capable of outputting an analog signal or a digital signal in proportion to a flow rate, and a flow rate setter 41 that outputs a flow rate reference signal. Additionally, the suction amount control device 40 includes an error amplifier 42 that compares the flow rate reference signal from the flow rate setter 41 with a signal from the flowmeter 38, and amplifies an error, and a valve driving device 43 that drives the flow rate control valve 31 based on a signal of the error amplifier 42.

This suction amount control device 40 causes the flow rate control valve 31 to have an indicated flow rate of the flow rate setter 41. The suction amount control device 40 can control the suction flow rate at a constant level to ensure suction of the hydrogen sources 4, even in a case where a factor caused by fluctuation of the suction flow rate such as fluctuation of shielding gas pressure supplied to the gas supply port 34, increase of a pressure loss due to clogging of the filter 39, or the like is generated.

Figure 6:
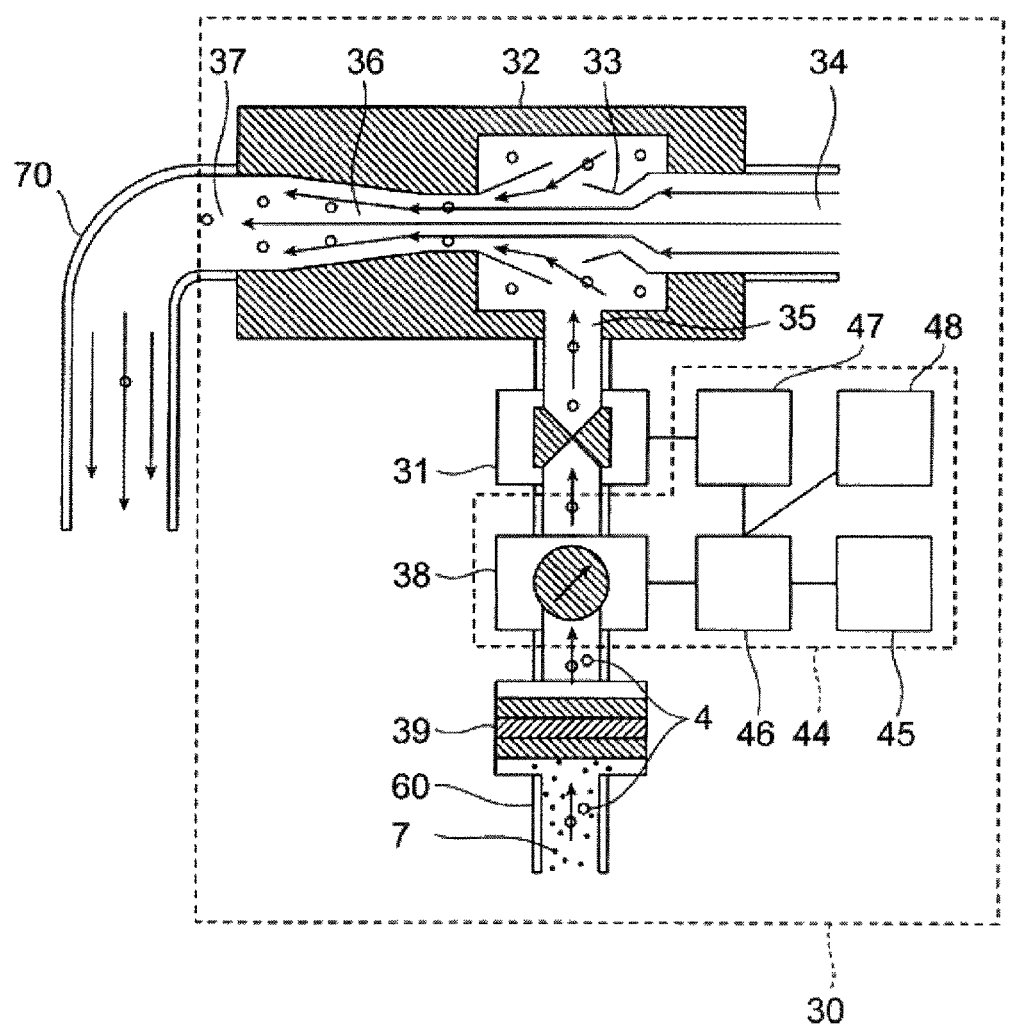
FIG. 6 is a diagram illustrating another configuration example of the suction device.

As illustrated in FIG. 6, the suction device 30 may include a suction amount abnormality detection device 44 for detecting abnormality as to a suction amount of shielding gas. The suction amount abnormality detection device 44 includes a flowmeter 38 that outputs an analog signal or a digital signal in proportion to a suction flow rate, a reference threshold value setter 45 that outputs a threshold value as a reference of an abnormal value of a suction flow rate with an analog signal or a digital signal, and an abnormality determination unit 46 that receives the signal of the flowmeter 38 and the signal of reference threshold value setter 45 to determine abnormality. The suction amount abnormality detection device 44 includes an abnormality indicator 47 such as a buzzer and a pilot lamp, which receives the signal determined as abnormality by the abnormality determination unit 46 to generate an alarm. Furthermore, the suction amount abnormality detection device 44 includes a welding stop controller 48 that has a function of receiving the signal determined as abnormality by the abnormality determination unit 46, interrupting a torch switch signal indicating arc output in the welding torch 10, and stopping welding.

The flowmeter 38 of the suction amount abnormality detection device 44 may be a float-type flowmeter. In a case where the flowmeter 38 is the float-type flowmeter, the reference threshold value setter 45 is a photosensor installed at least any one of an upper limit and a lower limit of a position of a float. Any one of the abnormality indicator 47 and the welding stop controller 48 may be provided. Use of such a suction amount abnormality detection device 44 inhibits the welding worker from continuing welding without noticing the abnormality of the suction amount. The suction device 30 illustrated in FIG. 6 does not include the suction amount control device 40, but may further include the suction amount control device 40.

Figure 7:
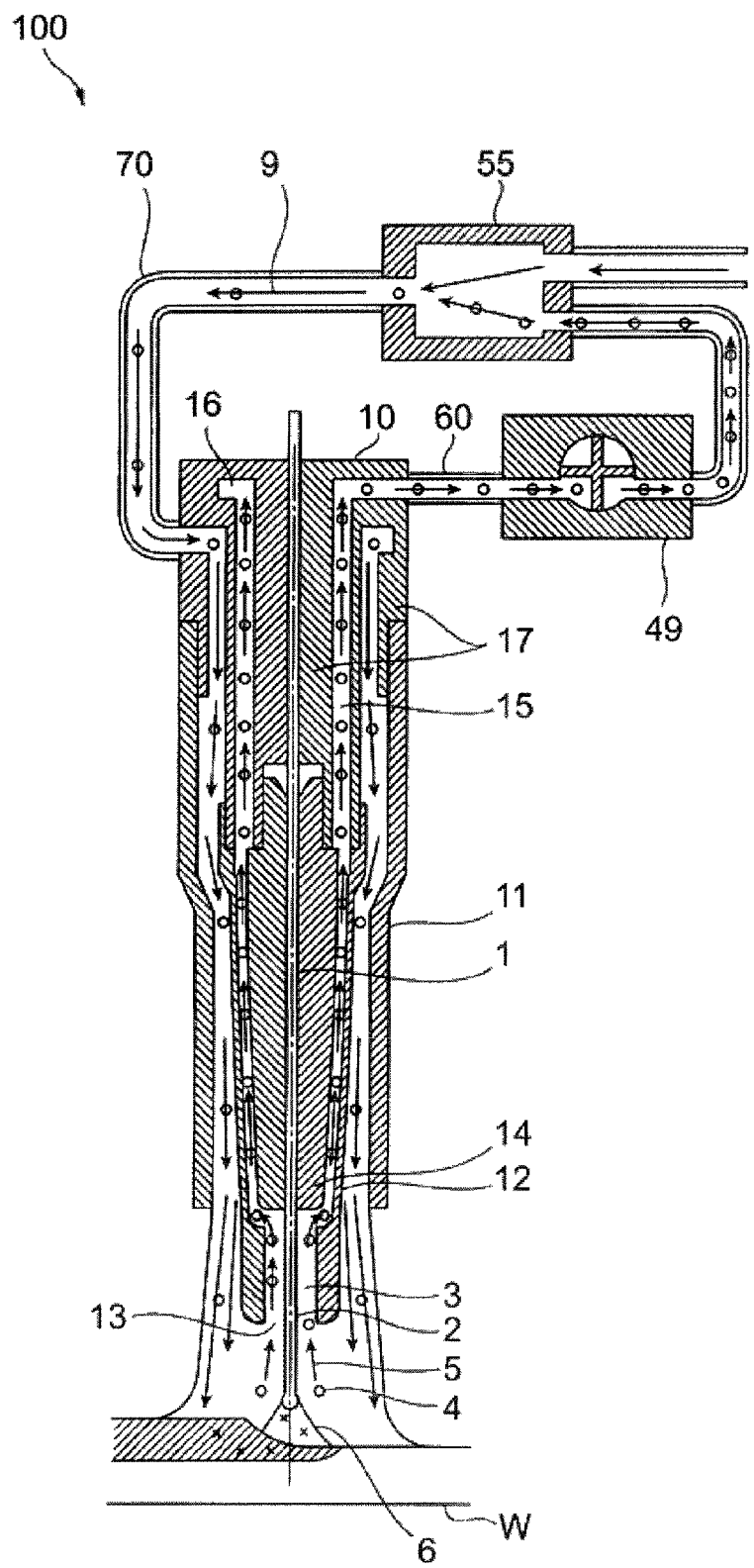
FIG. 7 is a diagram illustrating another configuration example of the suction device.

As illustrated in FIG. 7, as the suction device 30, a mechanical vacuum pump 49 may be used in place of the ejector 32. In this case, the vacuum pump 49 sucks shielding gas from the vicinity of the wire protruding section 2. The vacuum pump 49 may be a commercially available known vacuum pump, and various types of vacuum pumps such as a rotary type vacuum pump, a piston type vacuum pump, and a diaphragm type vacuum pump are applied. Additionally, a vacuum pump including a motor whose suction flow rate control is easy as a driving source is preferable. The rotational speed of this motor is controlled, so that the suction flow rate can be adjusted.

In a case where the vacuum pump 49 is used in the suction device 30, a mixer 55 for mixing sucked shielding gas with new shielding gas is provided. The mixed shielding gas which is mixed in the mixer 55 flows in the direction illustrated by the arrows 9, and is led to a shielding gas supply nozzle 11 through a mixed shielding gas supply path 70. Furthermore, also in the configuration where the vacuum pump 49 is used in place of the ejector 32, the suction device 30 may include a flowmeter 38, a filter 39, a suction amount control device 40, and a suction amount abnormality detection device 44 similarly to FIGS. 3 to 6.

<Configuration Example of Welding Torch Provided with Function of Ejector>

Figure 8:
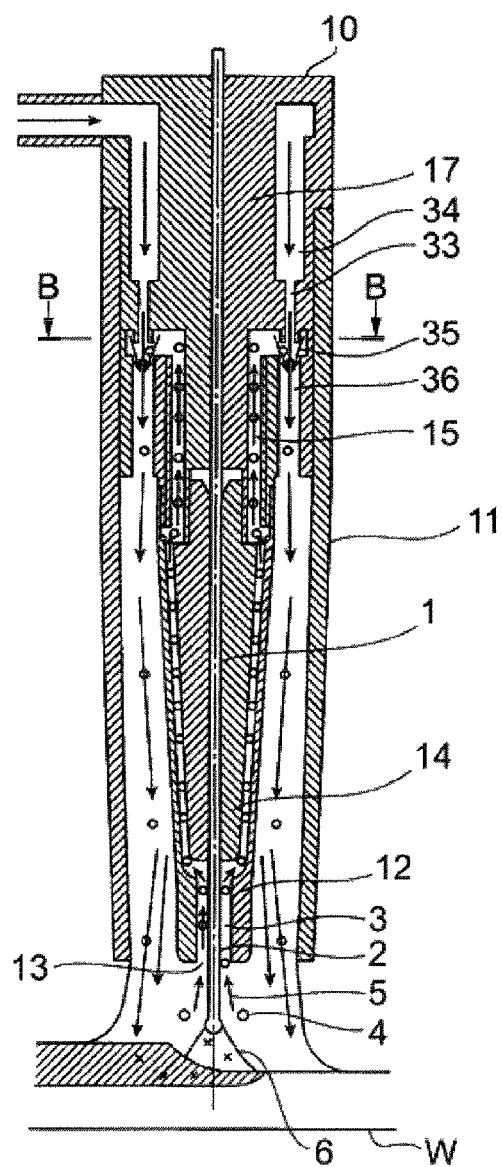
FIG. 8 is a diagram illustrating a configuration example of a welding torch having a function of an ejector.
Figure 9:
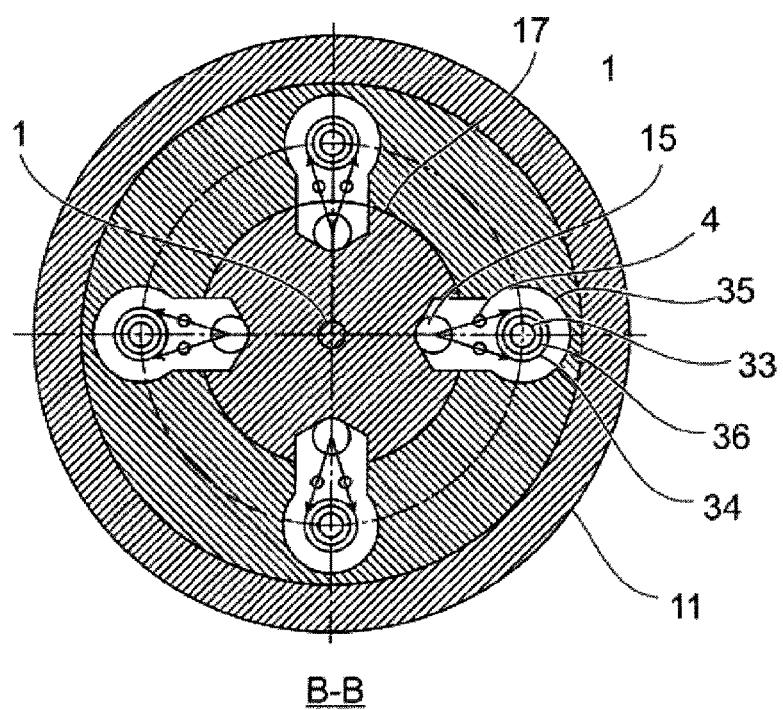
FIG. 9 is a sectional view taken along the B-B part of FIG. 8 in the welding system.

Now, another configuration example of the welding system 100 will be described. The welding system 100 may implement a function of the ejector 32 inside the welding torch 10. FIG. 8 is a diagram illustrating a configuration example of a welding torch 10 provided with the function of the ejector 32. FIG. 9 is a sectional view taken along the B-B part of FIG. 8 in the welding system 100.

The welding torch 10 illustrated in FIG. 8 includes a contact chip 14 which supplies power to a wire 1 with a welding current, a suction nozzle 12 having a structure of surrounding a periphery 3 of a wire protruding section 2, and having an opening 13 directed toward a tip of the wire 1, and a chip body 17 that is a body part of the welding torch 10.

As illustrated in FIGS. 8 and 9, the welding torch 10 includes gas supply ports 34 that supply, to driving nozzles 33, new shielding gas sent from an external shielding gas supply device (not illustrated), and the driving nozzles 33 that are paths for allowing new shielding gas to flow, and jet shielding gas toward inlets of mixer tubes 36. The suction nozzles 12 perform suction by utilizing the flow of the shielding gas jetted by the driving nozzles 33.

Furthermore, the welding torch 10 includes suction paths 15 that lead, to suction ports 35, shielding gas containing hydrogen sources 4 sucked from the suction nozzles 12, the mixer tubes 36 that mix the shielding gas containing the hydrogen sources 4 led to the suction port 35 with new shielding gas jetted from the driving nozzles 33, and a shielding gas supply nozzle 11 that is connected to outlets of the mixer tubes 36, and supplies the mixed shielding gas to a weld zone.

Herein, in this embodiment, in a case where the functions of the ejector 32 are implemented inside the welding torch 10, and the suction nozzle 12, the suction paths 15, the gas supply ports 34, the driving nozzles 33, and the suction ports 35 illustrated in FIG. 8 are used as an example of the suction sections. The mixer tubes 36 illustrated in FIG. 8 are used as an example of the mixing sections.

Thus, with the configuration in which suction and mixing functions each including the driving nozzle 33 and the mixer tube 36 are incorporated in the welding torch 10, diffusible hydrogen in the weld metal is reduced. Even when such a welding torch 10 is used, sufficient suction at a shielding gas flow rate necessary for usual welding is possible, and this configuration is compact and excellent in handling at a low cost compared with the configuration in which the ejector 32 is provided outside the welding torch 10.

FIGS. 8 and 9 each illustrate an example in which four suction and mixing functions are provided in the welding torch 10. The suction and mixing functions may be provided such that the flow velocity of the mixed shielding gas is uniform in the shielding gas supply nozzle 11. For example, three suction and mixing functions may be provided, or eight suction and mixing functions may be provided. Additionally, the flow velocity of the mixed shielding gas can be uniformized by lengthening the shielding gas supply nozzle 11, the number of the suction and mixing functions thus described is not limited, and at least one suction and mixing function is needed.

Furthermore, in the case where the welding torch 10 illustrated in FIG. 8 is used, the welding worker cannot confirm the suction amount of the shielding gas in the welding. However, it is confirmed from an experiment that even when the shielding gas flow rate, and the shielding gas supply pressure changes, the suction amount does not largely fluctuate, and when the suction amount is 3 liters/min or more, the reduction effect of diffusible hydrogen is obtained. Even when the suction amount is 10 liters/min or more, sucked shielding gas is reused, and therefore the shielding gas flow rate does not become insufficient, which is a practical configuration. Additionally, even when the welding worker cannot confirm the suction amount of the shielding gas during welding, the welding worker can confirm the suction flow rate by making shielding gas to flow before welding, and connecting the flowmeter to a tip of the suction nozzle 12, and therefore lowering of welding quality is suppressed.

<Configuration Example in Case where Shielding Gas is not Mixed>

The configuration in which the welding system 100 sucks the shielding gas to mix the shielding gas with the new shielding gas is described. However, the sucked shielding gas may be exhausted to the outside without being mixed with the new shielding gas. Even in the configuration in which the sucked shielding gas is exhausted, the shielding gas containing the hydrogen sources 4 discharged from the heated wire 1 is sucked, so that entering of diffusible hydrogen into the weld metal is suppressed, and the amount of the diffusible hydrogen in the weld metal is reduced.

Figure 10:
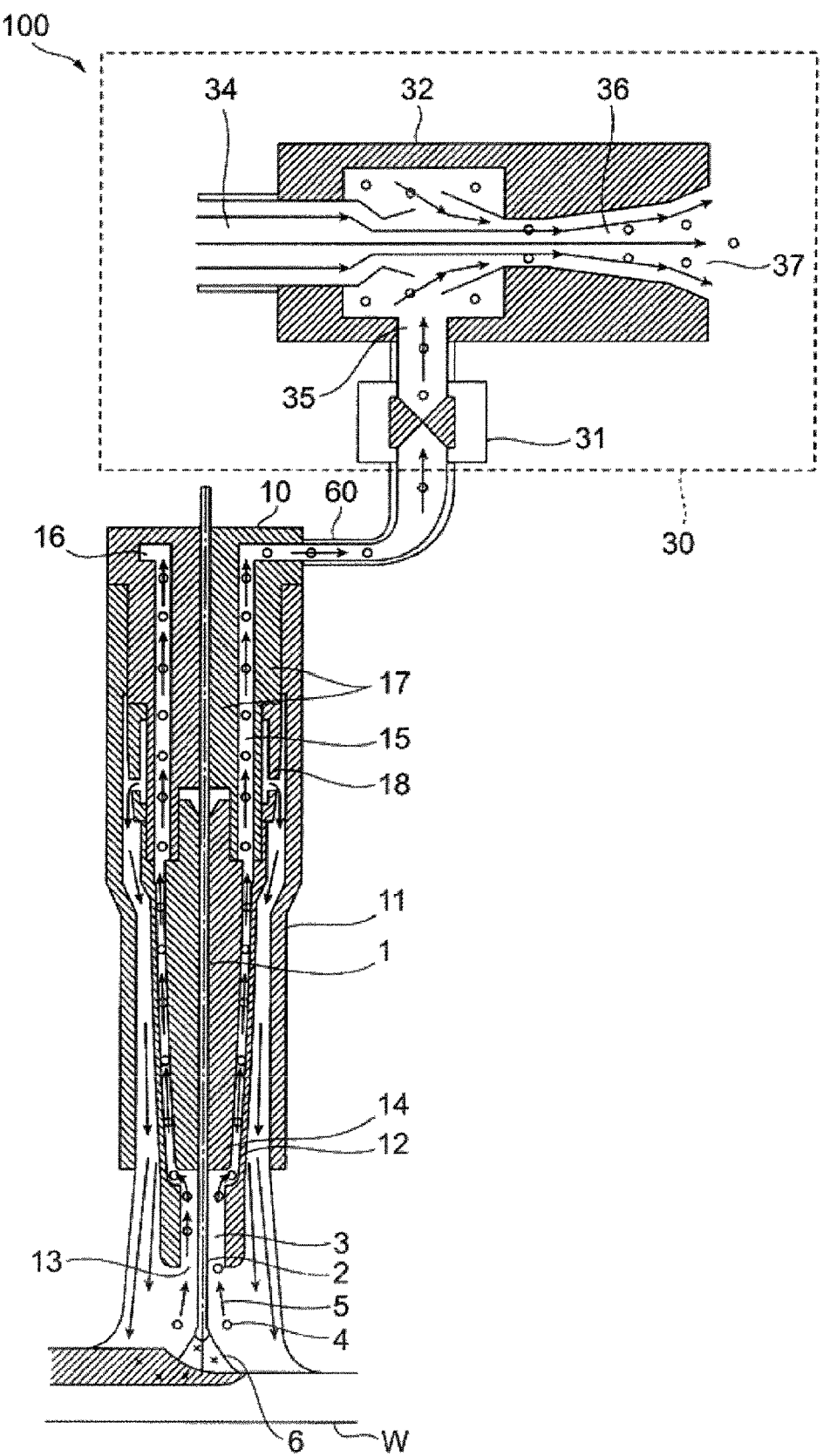
FIG. 10 is a diagram illustrating a configuration example in a case where the welding system exhausts sucked shielding gas.

FIG. 10 is a diagram illustrating a configuration example in a case where the welding system 100 exhausts the sucked shielding gas. As illustrated in FIG. 10, a suction device 30 sucks shielding gas from a suction nozzle 12 through a suction path 15, and exhausts the sucked shielding gas to the outside. The suction device 30 illustrated in FIG. 1 sucks the shielding gas while using the new shielding gas as a driving source in the ejector 32. On the other hand, the suction device 30 illustrated in FIG. 10 does not use the new shielding gas as the driving source in suction, but utilizes a flow of compressed air which is an example of compressed gas.

An ejector 32 of the suction device 30 includes a gas supply port 34, a suction port 35, a mixer tube 36, and an exhaust port 37. Compressed air flows in the horizontal direction, so that flow velocity increases at a thinned part in a tube, the tube corresponding to a vertical line of a T-shape becomes the suction port, and shielding gas is sucked from the suction port 35 through the suction nozzle 12. Then, the sucked shielding gas is exhausted from the exhaust port 37.

The gas supply port 34 is connected to a factory air pipe (not illustrated) or an output port of a compressor, and compressed air is supplied. As the supplied compressed air, 0.5 MPa generally used in a factory is enough. However, from an experiment, it is confirmed that even when this pressure is changed to 0.3 MPa, in a case where the suction flow rate is 5 liters/min, the suction flow rate is lowered to about 94%, and the stable suction flow rate is secured. Additionally, any small ejector may be used as the ejector 32, and the consumption flow rate of the compressed air may be, for example, about 35 liters/min.

The welding system 100 illustrated in FIG. 10 supplies new shielding gas sent from an external shielding gas supply device (not illustrated) to a weld zone, and is not provided with a mixed shielding gas supply path 70 unlike the welding system 100 illustrated in FIG. 1. Furthermore, an orifice 18 which is a throttle for uniformizing shielding gas sent from the shielding gas supply device is disposed inside the welding torch 10.

Furthermore, even in the configuration of the welding system 100 that exhausts the sucked shielding gas, a flowmeter 38 may be disposed between the suction port 35 and a sucked shielding gas supply path 60, similarly to the suction device 30 illustrated in FIG. 3. Additionally, a filter 39 may be provided between the suction port 35 and the sucked shielding gas supply path 60 similarly to the suction device 30 illustrated in FIG. 4. Furthermore, a suction amount control device 40 may be provided similarly to the suction device 30 illustrated in FIG. 5. A suction amount abnormality detection device 44 may be provided similarly to the suction device 30 illustrated in FIG. 6. A vacuum pump 49 may be used in place of the ejector 32 similarly to the suction device 30 illustrated in FIG. 7.

Figure 11:
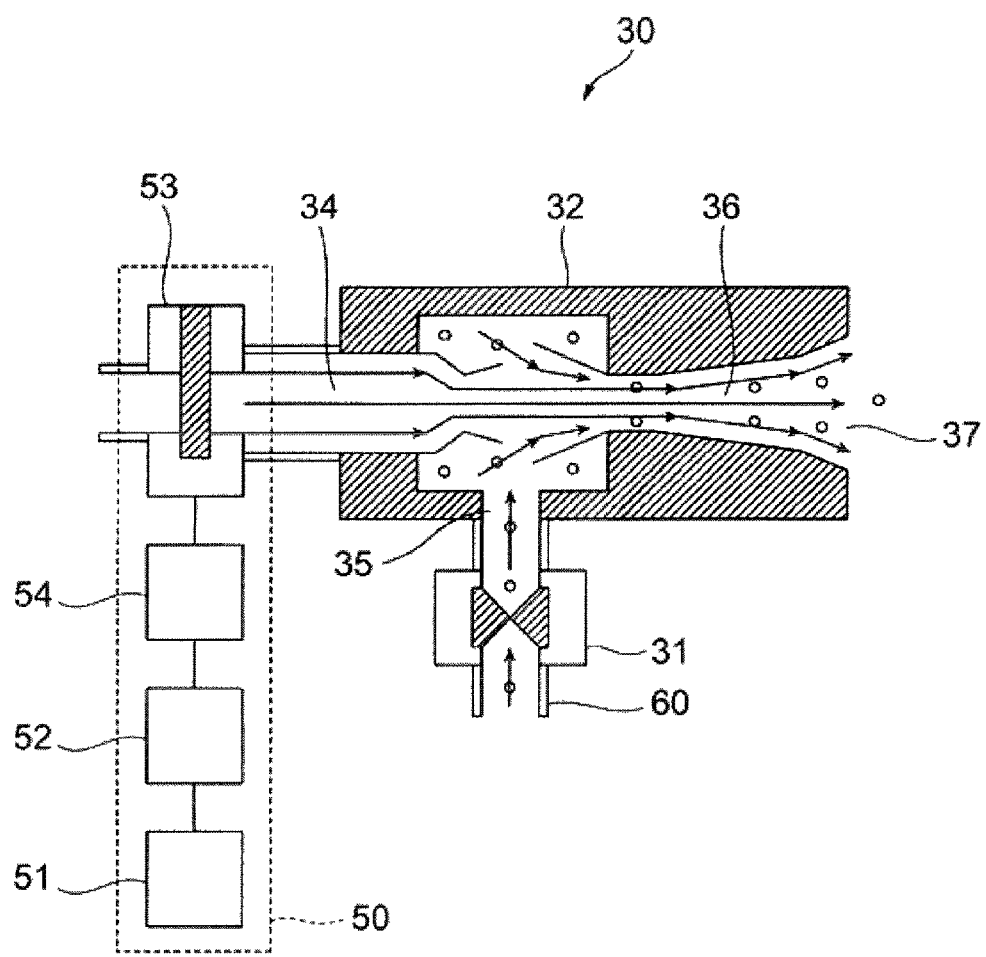
FIG. 11 is a diagram illustrating an example of a configuration in which the suction device includes a suction device activation controller.

In a case where the shielding gas is not mixed, the shielding gas is not automatically sucked unlike the configuration illustrated in FIG. 1. Therefore, as illustrated in FIG. 11, the suction device 30 may include a suction device activation controller 50 that controls start and stop of suction by the suction device 30. This suction device activation controller 50 is an example of the suction means activation control device. FIG. 11 is a diagram illustrating an example of a configuration in which the suction device 30 includes the suction device activation controller 50. The suction device activation controller 50 includes a receiver 51 that receives a welding start signal for informing start of welding and a welding stop signal for informing stop of welding, a determination unit 52 that generates an activation start signal and an activation stop signal of the suction device 30 based on the signal received by the receiver 51, an air supplying solenoid valve 53 that controls supply of the compressed air, and a solenoid valve driving device 54 that drives the air supplying solenoid valve 53 based on the activation start signal and the activation stop signal generated by the determination unit 52. An upstream side of the air supplying solenoid valve 53 is connected to a supply source of the compressed air.

Herein, as the signal for informing start or stop of welding, for example, a torch switch signal, a shielding gas solenoid valve signal for controlling opening and closing of a solenoid valve in the external shielding gas supply device, a shielding gas detection signal generated when it is determined that shielding gas flows inside the welding torch 10, or the like is applied. In a case where the vacuum pump 49 is used as the suction device 30, a motor driving device (not illustrated) is used in place of the solenoid valve driving device 54, and a motor (not illustrated) is used in place of the air supplying solenoid valve 53, so that a configuration of the suction device activation controller 50 is attained.

The suction device activation controller 50 performs control for supplying compressed air to start suction of the shielding gas when welding is started. Additionally, the suction device activation controller 50 performs control for stopping supply of the compressed air to stop suction of the shielding gas, when welding is stopped or when being slightly delayed from the stop. Therefore, the compressed air is consumed only when needed, and a consumption amount of the compressed air is suppressed.

<Another Configuration Example of Nozzle Part of Welding Torch>

Now, another configuration example of the nozzle part of the welding torch 10 will be described. FIGS. 12 to 15 each show a diagram illustrating another configuration example of the nozzle part of the welding torch 10.

Figure 12:
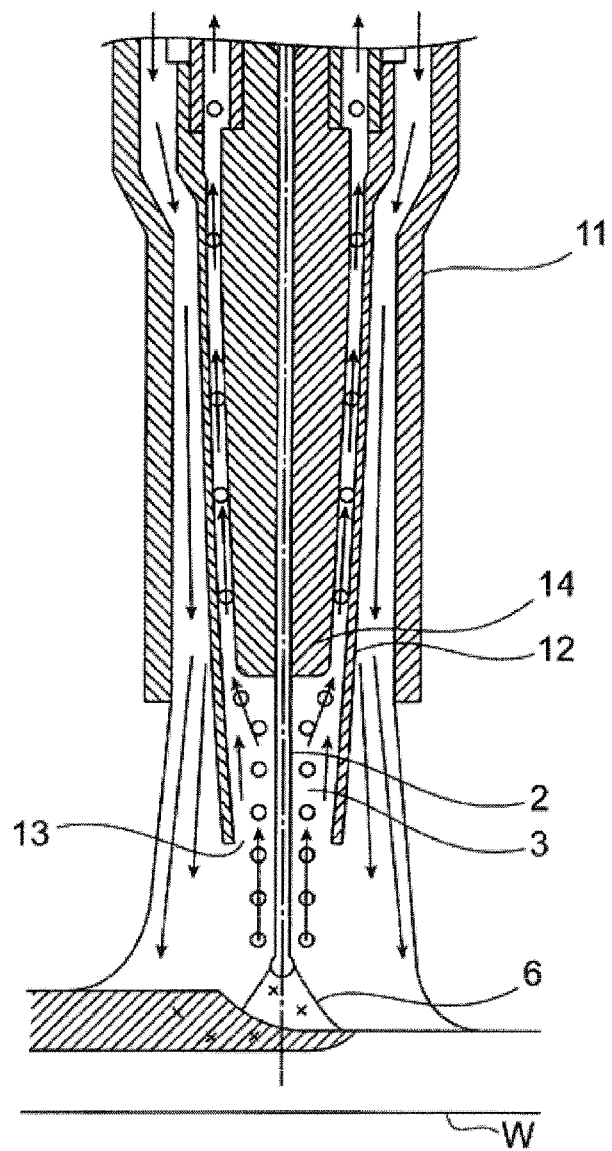
FIG. 12 is a diagram illustrating another configuration example of a nozzle part of the welding torch.

In a suction nozzle 12 illustrated in FIG. 12, the wall thickness of the part surrounding the periphery 3 of the wire protruding section 2 in the suction nozzle 12 illustrated in FIG. 1 is increased to the same size as another part of the suction nozzle 12. Additionally, the wall thickness of the part surrounding the periphery 3 of the wire protruding section 2 is changed, so that the cross-section area of an opening 13 is larger than the cross-section area in a case of the suction nozzle 12 of FIG. 1.

Figure 13:
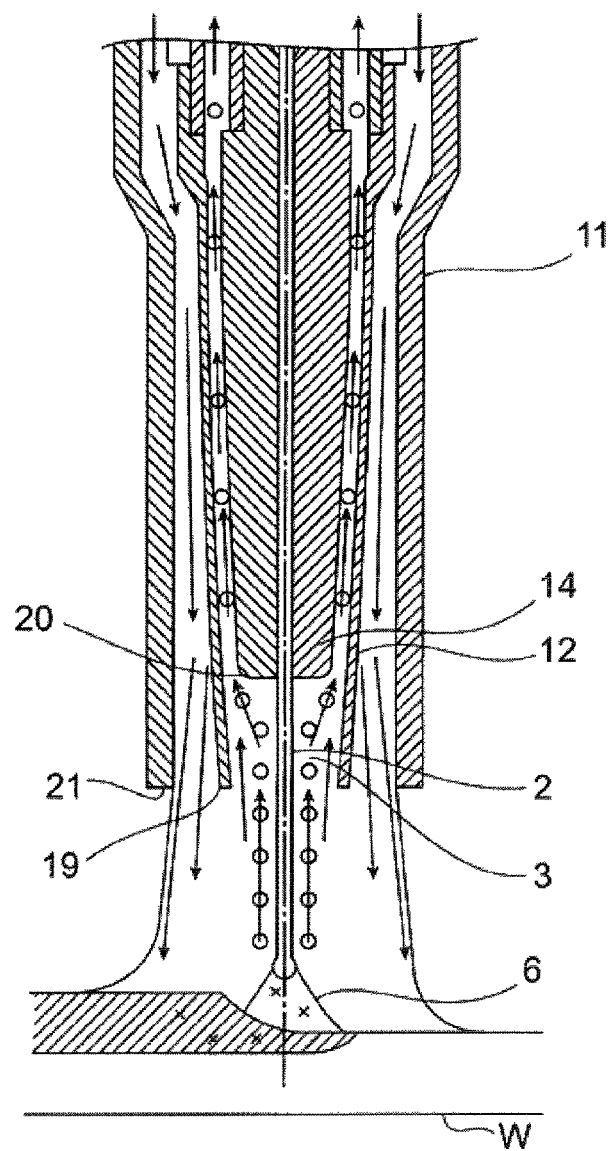
FIG. 13 is a diagram illustrating another configuration example of the nozzle part of the welding torch.

In the example illustrated in FIG. 13, compared to the example illustrated in FIG. 12, a shielding gas supply nozzle 11 is lengthened, a suction nozzle 12 is shortened, the height of a suction nozzle tip 19 (distance from the suction nozzle tip 19 to a workpiece W) is the same as the height of a shielding gas supply nozzle tip 21 (distance from the shielding gas supply nozzle tip 21 to the workpiece W). Furthermore, in the example illustrated in FIG. 14, the height of a suction nozzle tip 19, and the height of a shielding gas supply nozzle tip 21 each are the same as the height of a contact chip tip 20 (distance from the contact chip tip 20 to a workpiece W), and a suction nozzle 12 does not surround a periphery of the wire protruding section 2.

Figure 15:
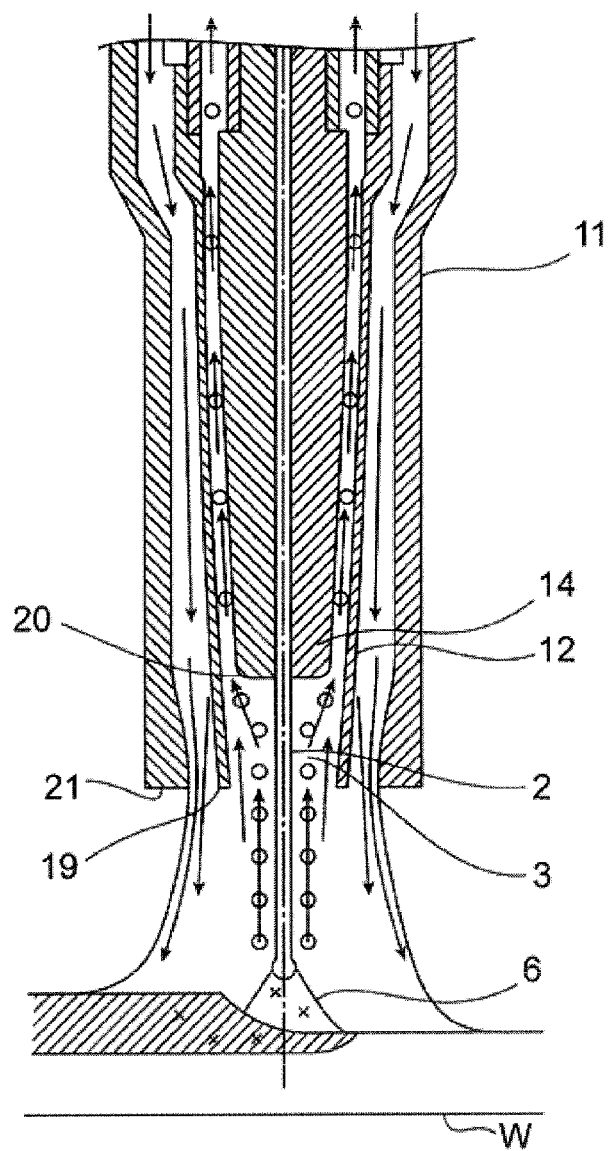
FIG. 15 is a diagram illustrating another configuration example of the nozzle part of the welding torch.

The shielding gas supply nozzle 11 having a constant nozzle diameter in FIG. 1 and the like may be formed such that the shielding gas supply nozzle tip 21 is narrowed toward a tip as illustrated FIG. 15. On the other hand, the shielding gas supply nozzle tip 21 may be expanded toward the tip.

Generally, the hydrogen sources 4 discharged from the wire 1 are unlikely to vaporize, when the protruding length which is the length of the wire 1 protruding from the contact chip 14 is shortened. On the other hand, when the protruding length is long, stability of the arc 6 is lost. Therefore, the protruding length for sucking the hydrogen sources 4 is a length enough to enable the hydrogen sources 4 to vaporize, and is adjusted not to be excessive long for stability of the arc 6.

Generally, when the distance from the shielding gas supply nozzle tip 21 to the arc 6 is shortened, an effect of shielding the weld zone by shielding gas is enhanced. Therefore, the height of the shielding gas supply nozzle tip 21 is adjusted in consideration of the shielding effect by shielding gas. In this embodiment, in the configuration enabling suction of shielding gas by the suction nozzle 12, a reduction effect of diffusible hydrogen is obtained, and therefore the height of the shielding gas supply nozzle tip 21 is not limited.

Figure 14:
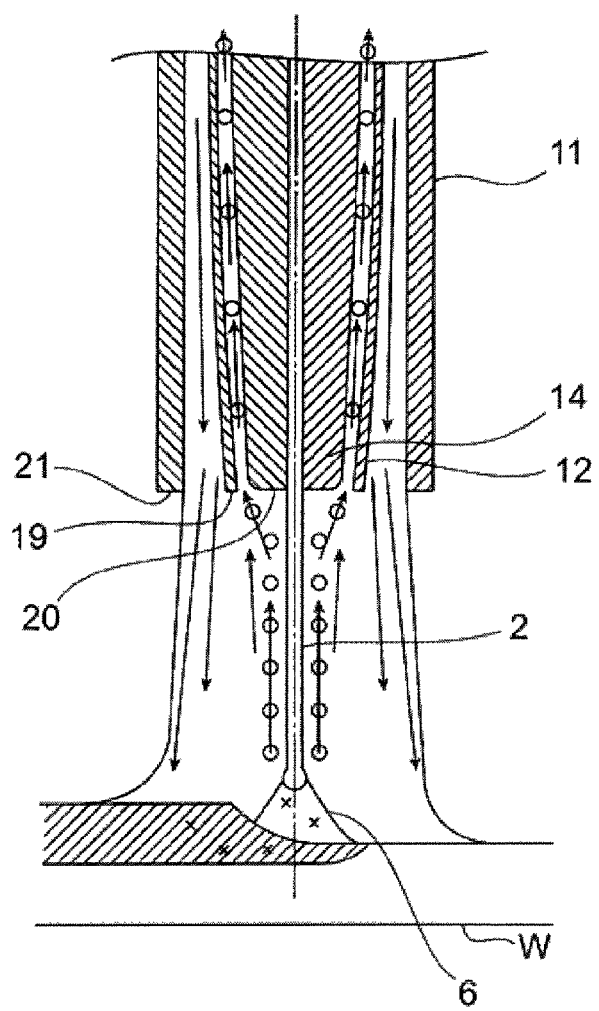
FIG. 14 is a diagram illustrating another configuration example of the nozzle part of the welding torch.

In the suction nozzle 12 according to this embodiment, as the distance from the suction nozzle tip 19 to the arc 6 is shortened in consideration of influence by arc heat, the hydrogen sources 4 discharged in the vicinity of the wire tip are likely to be sucked. Furthermore, like the suction nozzle 12 illustrated in each of FIGS. 1, 12, 13, and 15, the suction nozzle 12 sucks while surrounding the periphery 3 of the wire protruding section 2, so that shielding gas having high hydrogen concentration is likely to be sucked. However, as illustrated in FIG. 14, even when the configuration in which the suction nozzle 12 does not surround the periphery of the wire protruding section 2 is used, the reduction effect of diffusible hydrogen is obtained by suction of shielding gas.

EXAMPLE

Now, an experimental result is illustrated, and an example of this embodiment will be described.

In the welding system 100 illustrated in FIG. 1, under a welding condition that a flow rate of shielding gas supplied from the shielding gas supply nozzle 11 was 25 liters/min, the wire protruding length was 25 mm, and a welding current was 270 amperes (unit of current: A), welding was performed by use of a flux cored wire which did not contain fluoride and had a diameter of 1.2 mm. A diffusible hydrogen amount in weld metal in a case where suction was not performed by the suction device 30, and a diffusible hydrogen amount in weld metal in a case where suction was performed by the suction device 30 were measured. Additionally, in the case where the suction was performed by the suction device 30, a suction flow rate of shielding gas sucked from the vicinity of the wire protruding section 2 by the suction nozzle 12 was set to 5 liters/min, and the sucked shielding gas was mixed with new shielding gas of 25 liters/min, so that the mixed shielding gas of a total of 30 liters/min was supplied to the weld zone to be welded. The diffusible hydrogen amount in the weld metal was measured based on a gas chromatograph method regulated in JIS Z 3118.

As a result, the diffusible hydrogen amount in the case where suction was not performed by the suction device 30 was 6 milliliters/100 g (diffusible hydrogen amount contained in weld metal of 100 g was 6 milliliters). On the other hand, the diffusible hydrogen amount in the case where suction was performed by the suction device 30 was 3 milliliters/100 g, and the diffusible hydrogen amount in the weld metal was reduced compared with the case where suction was not performed.

It is considered that the reason why the diffusible hydrogen amount in the weld metal is not zero is because hydrogen sources 4 are supplied from a part other than the wire 1. However, the fact that all diffusible hydrogen on the surface of the wire 1 and inside the flux is not discharged is considered to be one of the reasons. As described above, as the wire protruding length is increased, discharge of diffusible hydrogen is facilitated. However, arc stability of welding tends to deteriorate. Therefore, the wire protruding length is preferably selected in accordance with usage and a situation of welding.

Now, under the same welding condition, the suction flow rate was changed to 3 liters/min and 10 liters/min, that is, the flow rate of the mixed shielding gas was changed to 28 liters/min and 35 liters/min, and the diffusible hydrogen amounts in the weld metal were measured. As a result, the respective diffusible hydrogen amounts in a case where the suction flow rate was 3 liters/min and 10 liters/min were 3.5 milliliters/100 g, and 2.5 milliliters/100 g. A higher suction flow rate has a higher reduction effect of the diffusible hydrogen amount, and the higher suction flow rate does not influence shielding performance, and therefore a suction flow rate of about 10 liters/min is recommended. However, reduction in the suction flow rate is considered in order to enhance the effect of the shielding performance, and therefore the suction flow rate is preferably selected in accordance with usage and a situation of welding.

Now, under the same welding condition, the diffusible hydrogen amount in the weld metal was measured by use of a solid wire as a wire in place of the flux cored wire. Herein, in the case where suction was performed by the suction device 30, the suction flow rate was set to 10 liters/min, and the flow rate of the mixed shielding gas was set to 30 liters/min. As a result, the diffusible hydrogen amount in the case where suction was not performed by the suction device 30 was 2.5 milliliters/100 g. On the other hand, the diffusible hydrogen amount in the case where suction was performed at a suction flow rate of 10 liters/min by the suction device 30 was 1 milliliter/100 g, the diffusible hydrogen amount in the weld metal was reduced compared to the case where suction was not performed.

The solid wire does not contain flux, and therefore lubricant on a wire surface, adhered moisture, and the like merely become hydrogen sources, and the amount of generated diffusible hydrogen is less compared to the case of using the flux cored wire. Even in a case where such a solid wire was used, it was confirmed that the diffusible hydrogen amount in the weld metal was reduced by suction by the suction device 30.

Now, under the same welding condition, the diffusible hydrogen amount in the weld metal was measured by use of a flux cored wire with fluoride contained in flux was measured. However, the amount of fluoride to be contained in the flux is an amount of fluoride which does not largely prevent arc stability. In the case where suction was performed by the suction device 30, the suction flow rate was set to 5 liters/min, and the flow rate of the mixed shielding gas was set to 30 liters/min. As a result, the diffusible hydrogen amount in the case where suction was not performed by the suction device 30 was 3 milliliters/100 g. On the other hand, the diffusible hydrogen amount in the case where suction was performed at a suction flow rate of 5 liters/min by the suction device 30 was 1 milliliter/100 g, and the diffusible hydrogen amount in the weld metal was reduced compared to the case where suction was not performed.

Fluoride has an effect for lowering hydrogen partial pressure in the vicinity of the arc 6, and therefore even in the case where suction is not performed, the diffusible hydrogen amount in the weld metal can be reduced, and a lower diffusible hydrogen amount is expected by containing fluoride in the flux, compared to a case where fluoride is not contained in flux. In addition, in the case where suction was not performed by the suction device 30 by use of a flux cored wire with no fluoride under the same welding condition, the diffusible hydrogen amount was 6 milliliters/100 g as described above. On the other hand, the diffusible hydrogen amount was reduced to 3 milliliters/100 g by addition of fluoride. Then, suction was further performed by the suction device 30, so that the diffusible hydrogen amount was reduced, and the diffusible hydrogen amount was equivalent to the diffusible hydrogen amount (1 milliliter/100 g) in the above case where the solid wire was used.

The flux cored wire includes more hydrogen sources than the solid wire due to moisture absorption of the flux. On the other hand, the flux cored wire has excellent arc stability and efficiency, is excellent in productivity of special high alloy wire, and is suitable for special small-lot production. When the diffusible hydrogen amount in a case where the flux cored wire is used is made to be equivalent to the diffusible hydrogen amount in a case where the solid wire is used, by addition of fluoride, a problem that there are many hydrogen sources is reduced. Therefore, in welding, the flux cored wire having various advantages is easily used.

Under the same welding condition, the suction amount sucked from the suction nozzle 12 was changed from 5 liters/min to 25 liters/min, the diffusible hydrogen amount in the weld metal, a nitrogen amount in the weld metal, and an incidentally sucked fume amount (ratio of a sucked fume amount to all generated fume amount) were measured. FIG. 16 is a chart illustrating an example of a measurement result in a case where the suction amount is changed.

As illustrated in FIG. 16, while the diffusible hydrogen amount in the weld metal was lowered by increase of the suction amount from the suction nozzle 12, shielding performance was deteriorated, and therefore the nitrogen amount in the weld metal was increased. Herein, when the nitrogen amount in the weld metal exceeds 100 ppm, toughness of the weld metal is deteriorated, and when the nitrogen amount in the weld metal further exceeds 150 ppm, a blowhole which is a kind of defects of the weld zone is generated. Additionally, when the incidentally sucked fume amount is increased, a replacement frequency of the filter 39 provided in order to protect devices such as the suction device 30 and the flowmeter 38 is increased. As illustrated in FIG. 16, a lowering effect of the diffusible hydrogen amount is saturated from a suction amount of 20 liters/min, and the nitrogen amount starts increasing.

Therefore, from the example illustrated in FIG. 16, it is said that a preferable upper limit of the suction amount sucked from the suction nozzle 12 is 20 liters/min. Herein, the flow rate of the shielding gas supplied from the shielding gas supply nozzle 11 is 25 liters/min, and therefore the suction amount sucked from the suction nozzle 12 is preferably 80% or less of the shielding gas flow rate. The suction amount is made to be 80% or less of the shielding gas flow rate, so that it is possible to prevent deterioration of the weld metal, and reduce the diffusible hydrogen amount in the weld metal while suppressing the suction amount of fumes.

Under the same welding condition, the flow velocity of the shielding gas supplied from the shielding gas supply nozzle 11 was fixed to 2.8 m/sec, the suction flow rate was changed by change of the opening cross-section area of the opening 13 located at the tip of the suction nozzle 12, and the change of the suction flow rate, and the diffusible hydrogen amount in the weld metal was measured. FIG. 17 is a chart illustrating the cross-section area of the opening 13 of the suction nozzle 12, and the suction flow rate in a case where the suction flow rate is changed. A unit of the suction flow rate is m/sec, and, for example, in a case where the cross-section area of the opening 13 is 11.4 mm$^2$, and the suction flow rate is 3 liters/min, the suction flow rate is 4.4 m/sec. FIG. 18 is a chart illustrating the cross-section area of the opening 13 of the suction nozzle 12, and the diffusible hydrogen amount measured in a case where the suction flow rate is changed. A unit of the diffusible hydrogen amount is milliliters/100 g, and, for example, in a case where the cross-section area of the opening 13 is 11.4 mm$^2$, and the suction flow rate is 3 liters/min, the diffusible hydrogen amount is 3.2 milliliters/100 g.

Herein, under the same welding condition, the diffusible hydrogen amount in the weld metal in a case where shielding gas is not sucked was 6 milliliters/100 g, as described above. Therefore, for example, in a case where the suction flow rate was 1.8 m/sec, the diffusible hydrogen amount was 4.4 milliliters/100 g, and the reduction effect of diffusible hydrogen is low. On the other hand, it was confirmed that the reduction effect of diffusible hydrogen largely appears from the vicinity of a suction flow rate of about 2.8 m/sec which was the same as the shielding gas flow velocity, and when the suction flow rate was 5 m/sec or more, the reduction effect was saturated. That is, the hydrogen sources 4 are led to the arc 6 by a flow of the supplied shielding gas and arc plasma gas, but the suction flow rate is preferably 1 time or more of the flow velocity of the supplied shielding gas in order to prevent this leading to exhaust the hydrogen sources 4 to the outside of the weld zone by suction.

<Configuration Example of Self-Shield Arc Welding>

Figure 19:
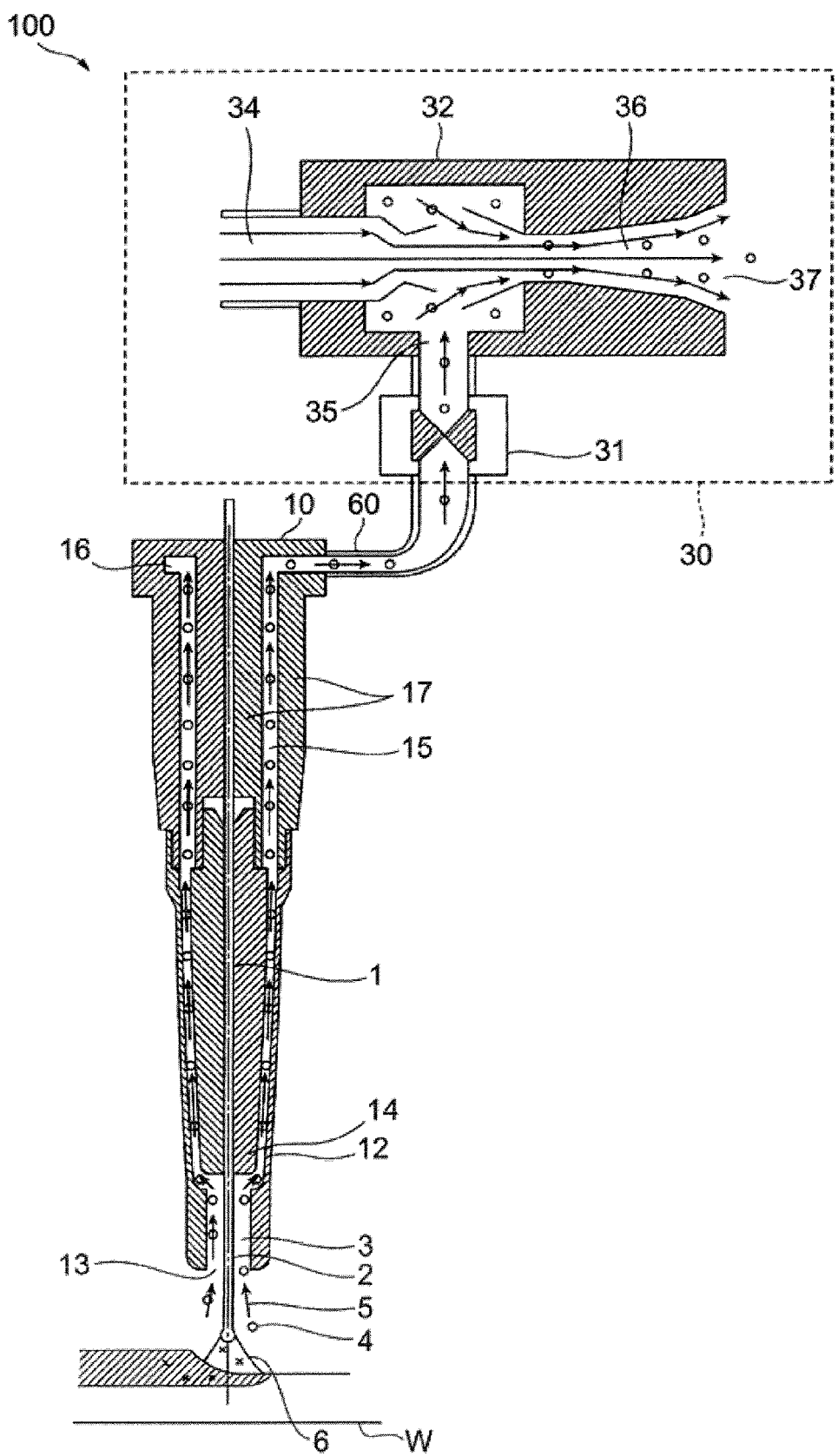
FIG. 19 is a diagram illustrating a configuration example of a welding system that performs self-shield arc welding.
Figure 20:
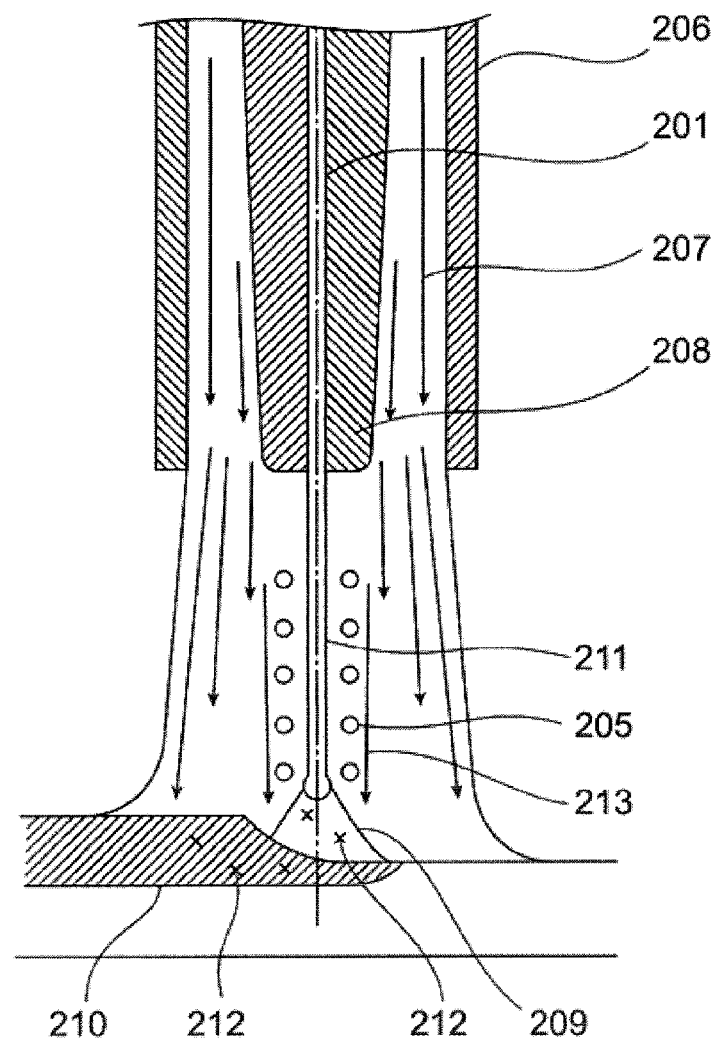
FIG. 20 is a diagram for illustrating a process of absorbing diffusible hydrogen in weld metal.
Figure 21:
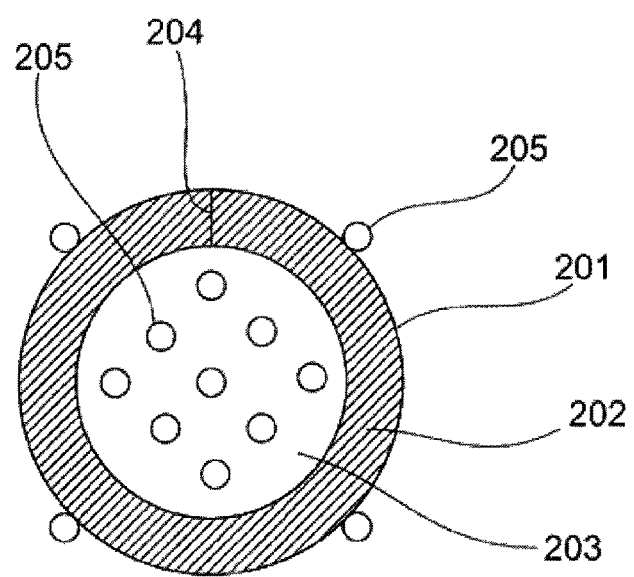
FIG. 21 is a diagram illustrating a cross-section of a flux cored wire.

In this embodiment, the welding system 100 performs gas shield arc welding. However, the welding system 100 may perform self-shield arc welding in which shielding gas is not supplied. FIG. 19 is a diagram illustrating a configuration example of a welding system 100 that performs self-shield arc welding.

In the self-shield arc welding, a self-shield wire is used as the wire 1. The self-shield wire is a wire for shielding by itself without using shielding gas, the wire being added with a particulate matter such as aluminum which fixes a shield auxiliary component and nitrogen becoming a blowhole to prevent generation of a blowhole. The welding system 100 does not supply shielding gas to a weld zone, and therefore does not include a shielding gas supply nozzle 11 unlike the configuration illustrated in FIGS. 1 and 10. On the other hand, the welding system 100 includes a suction nozzle 12 similarly to the configurations illustrated in FIGS. 1 and 10. Additionally, the welding system 100 includes a suction device 30 illustrated in FIG. 10, and sucks shielding gas. With such a configuration, absorption of diffusible hydrogen in weld metal is suppressed, and a diffusible hydrogen amount in the weld metal is reduced.

In the welding system 100 illustrated in FIG. 19, under a welding condition that a wire protruding length was 25 mm, and a welding current was 270 A, welding was performed by use of a flux cored wire having no fluoride contained therein and having a diameter of 1.2 mm. As a result, a diffusible hydrogen amount in the weld, metal in a case where suction was not performed by the suction device 30 was 7 milliliters/ 100 g. On the other hand, it was confirmed that the diffusible hydrogen amount in the weld metal in a case where suction was performed at a suction flow rate of 5 liters/min by the suction device 30 was 3 milliliters/100 g, and reduction in the diffusible hydrogen amount was attained in the weld metal in self-shield arc welding.

Thus, the present invention is described by use of the embodiments. However, the technical scope of the present invention is not limited to the above embodiments. It would be obvious to those skilled in the art that various changes can be made and alternative modes can be employed without departing from the spirit and scope of the invention.

The invention claimed is:

1. A welding device comprising:
a chip body having a cylindrical shape;
a contact chip that guides a welding wire, and supplies a welding current to the welding wire;
a suction section including a suction nozzle that
is positioned immediately outside of the contact chip,
surrounds a periphery of the welding wire protruding from an end of the contact chip, and
is opened toward a tip of the welding wire to suck a gas;
a mixing section that mixes the gas sucked from the suction section with new shielding gas; and
a shielding gas supply nozzle that supplies the gas mixed in the mixing section to a weld zone,
wherein a flow rate of gas containing a hydrogen source sucked from the suction nozzle is 80% or less of a flow rate of gas supplied from the shielding gas supply nozzle, and
wherein the shielding gas supply nozzle has a cylindrical shape, and is fixed by fitting into an opening side of the chip body,
wherein the suction nozzle has a cylindrical shape, is disposed inside the shielding gas supply nozzle, and is fixed by fitting into a tip end portion of the chip body on the opening side of a base end of the shielding gas supply nozzle,
wherein the contact chip is disposed inside the suction nozzle, and is fixed by fitting into the tip end portion of the chip body,
wherein the suction section includes a suction path communicating with an opening of the suction nozzle via a gap between the suction nozzle and the contact chip, and extending into the chip body from the tip end portion of the chip body, and
wherein a mixer tube is provided as the mixing section, the suction path and the mixer tube provided within the shielding gas supply nozzle, and the suction path sucks gas by utilizing a flow of the new shielding gas.

2. The welding device according to claim 1, wherein the suction section sucks the hydrogen source discharged from the welding wire from an arc column generated at a periphery of the welding wire protruding from the contact chip and in a tip of the welding wire, thereby reducing a diffusible hydrogen amount in weld metal.

3. The welding device according to claim 2, wherein the suction section includes a filter that removes a fume sucked together with the hydrogen source.

4. The welding device according to claim 1, wherein the suction section includes a vacuum pump.

5. The welding device according to claim 1, wherein the suction section includes a flowmeter for monitoring a suction flow rate.

6. The welding device according to claim 1, wherein the suction section includes a suction amount control device that controls a suction amount at a constant level.

7. The welding device according to claim 1, wherein the suction section includes a suction amount abnormality detection device that generates an alarm or stops welding when abnormality of a suction amount is detected.

8. The welding device according to claim 1, wherein
the welding device is a welding torch,
the suction path is configured for allowing the new shielding gas to flow, and includes a driving nozzle that jets the shielding gas,
the mixing tube that mixes the gas sucked from the suction section with shielding gas jetted from the driving nozzle, and
the shielding gas supply nozzle is connected to an outlet of the mixer tube, and supplies the gas mixed in the mixer tube to the weld zone.

9. A welding method for performing welding by consumable electrode type gas shield arc welding with a welding device, the welding device comprising:
a chip body having a cylindrical shape;
a contact chip that is fixed by fitting into a tip end portion of the chip body;
a shielding gas supply nozzle that has a cylindrical shape, and is fixed by fitting into an opening side of the chip body;
a suction nozzle that
has a cylindrical shape,
is disposed inside the shielding gas supply nozzle and immediately outside of the contact chip,
is fixed by fitting into the tip end portion of the chip body on the opening side of a base end of the shielding gas supply nozzle,
surrounds a periphery of the welding wire protruding from an end of the contact chip, and
is opened toward a tip of the welding wire to suck a gas; and
a suction path that communicates with an opening of the suction nozzle via a gap between the suction nozzle and the contact chip, and extends into the chip body from the tip end portion of the chip body,
the welding method comprising:
sucking gas containing hydrogen source discharged from the welding wire, from an arc column and a periphery of the arc column, by using the suction nozzle, the arc column being generated at the periphery of the welding wire protruding from the end of the contact chip and in the tip of the welding wire; and
exhausting the sucked hydrogen source to outside of a weld zone, thereby reducing a diffusible hydrogen amount in weld metal,
wherein a flow rate of gas containing the hydrogen source sucked from the suction nozzle is 80% or less of a flow rate of gas supplied from the shielding gas supply nozzle.

10. The welding method according to claim 9, wherein the welding wire is a flux cored wire containing fluoride.

11. The welding method according to claim 9, wherein flow velocity of gas containing the hydrogen source sucked from the suction nozzle is 1 time or more of flow velocity of gas supplied from the shielding gas supply nozzle.

12. A welding device comprising,
a contact chip that guides a welding wire, and supplies a welding current to the welding wire;

a suction section including a suction nozzle positioned immediately outside of the contact chip and that surrounds a periphery of the welding wire protruding from an end of the contact chip, and is opened toward a tip of the welding wire to suck a gas;

a mixing section that mixes the gas sucked from the suction section with new shielding gas; and a shielding gas supply nozzle that supplies the gas mixed in the mixing section to a weld zone, wherein a flow rate of gas containing a hydrogen source sucked from the suction nozzle is 80% or less of a flow rate of gas supplied from the shielding gas supply nozzle, wherein an ejector is provided as the suction section and the mixing section, the ejector has a T-shape formed by a first tube and a second tube, the first tube extending in a first direction from a gas supply port to an exhaust port leading to the shielding gas supply nozzle, the second tube extending in a second direction that is perpendicular to the first direction, the second tube leads the gas sucked by the suction nozzle to the mixing section, and the first tube narrows in diameter where the second tube joins to the first tube to suck the gas from the suction nozzle by utilizing a flow of the new shielding gas.

* * * * *